US011292203B2

(12) United States Patent
Ota et al.

(10) Patent No.: US 11,292,203 B2
(45) Date of Patent: Apr. 5, 2022

(54) SOLID OBJECT PRINTING SYSTEM AND SOLID OBJECT PRINTING METHOD

(71) Applicant: WILL BEE CO., LTD., Tokyo (JP)

(72) Inventors: Makoto Ota, Tokyo (JP); Haruhiko Moriguchi, Tokyo (JP)

(73) Assignee: WILL BEE CO., LTD., Tokyo (JP)

(*) Notice: Subject to any disclaimer, the term of this patent is extended or adjusted under 35 U.S.C. 154(b) by 235 days.

(21) Appl. No.: 16/662,456

(22) Filed: Oct. 24, 2019

(65) Prior Publication Data

US 2020/0055255 A1    Feb. 20, 2020

Related U.S. Application Data

(63) Continuation of application No. PCT/JP2018/015572, filed on Apr. 13, 2018.

(30) Foreign Application Priority Data

Apr. 28, 2017  (JP) ............... JP2017-090061
Jan. 31, 2018  (JP) ............... JP2018-014928

(51) Int. Cl.
| | | |
|---|---|---|
| *B29C 64/393* | (2017.01) | |
| *B29C 64/245* | (2017.01) | |
| *B29C 64/209* | (2017.01) | |
| *B29C 64/227* | (2017.01) | |
| *B33Y 50/02* | (2015.01) | |
| *B33Y 10/00* | (2015.01) | |

(Continued)

(52) U.S. Cl.
CPC .......... *B29C 64/393* (2017.08); *B29C 64/209* (2017.08); *B29C 64/227* (2017.08); *B29C 64/245* (2017.08); *B33Y 10/00* (2014.12); *B33Y 30/00* (2014.12); *B33Y 40/00* (2014.12); *B33Y 50/02* (2014.12)

(58) Field of Classification Search
CPC .... B41J 3/4073; B29C 64/386; B29C 64/393; B29C 64/209; B29C 64/227; B29C 64/245; B33Y 50/02
See application file for complete search history.

(56) References Cited

FOREIGN PATENT DOCUMENTS

| | | | |
|---|---|---|---|
| JP | 07-137398 A | | 5/1995 |
| JP | H07137398 A | * | 5/1995 |

(Continued)

OTHER PUBLICATIONS

Communication dated Dec. 21, 2020, from the Korean Intellectual Property Office in application No. 10-2019-7031780.

(Continued)

*Primary Examiner* — Nahida Sultana
*Assistant Examiner* — Jamel M Nelson
(74) *Attorney, Agent, or Firm* — Sughrue Mion, PLLC

(57) ABSTRACT

A solid object printing system includes: a print table for mounting a solid object to be subjected to printing; a detection unit for detecting a position and an orientation of the solid object mounted on the print table; a print data generation unit for generating print data corresponding to the solid object on a basis of a detection result of the position and the orientation of the solid object performed by the detection unit; a print unit for performing printing on the solid object by the print data generated by the print data generation unit; and a control unit for controlling the operations of the detection unit, the print data generation unit, and the print unit.

14 Claims, 23 Drawing Sheets

(51) Int. Cl.
 *B33Y 30/00* (2015.01)
 *B33Y 40/00* (2020.01)

(56) References Cited

FOREIGN PATENT DOCUMENTS

| | | | | |
|---|---|---|---|---|
| JP | 2006-335019 A | 12/2006 | | |
| JP | 2013208845 A | 10/2013 | | |
| JP | 2015-134410 A | 7/2015 | | |
| JP | 2015134410 A | * | 7/2015 | ............ B41J 3/4073 |
| JP | 2017-071173 A | 4/2017 | | |
| JP | 2017071173 A | * | 4/2017 | |

OTHER PUBLICATIONS

International Search Report of PCT/JP2018/015572 dated Jun. 5, 2018 [PCT/ISA/210].

* cited by examiner

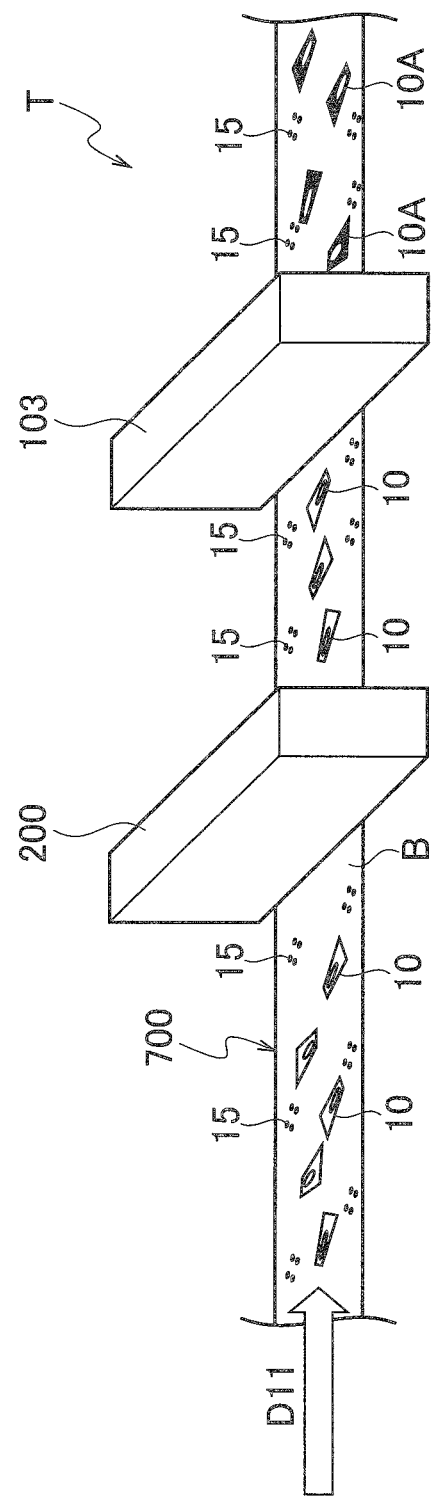

POSTURE ANGLE 90°

POSTURE ANGLE 88°

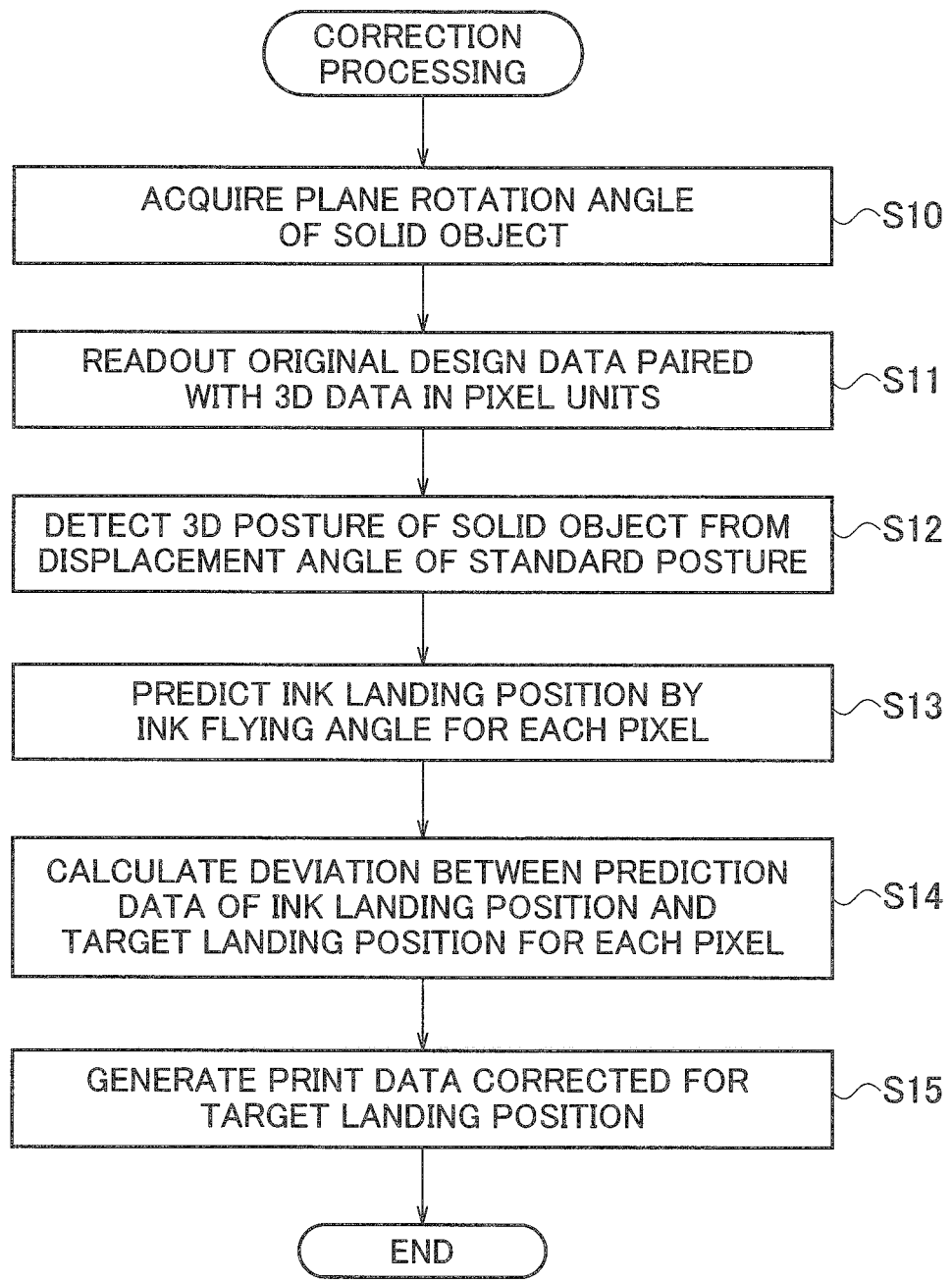

ORIGINAL DESIGN DATA

PREDICTION OF INK LANDING DEVIATION

CORRECTION PRINT DATA

SOLID OBJECT PRINTING SYSTEM AND SOLID OBJECT PRINTING METHOD

CROSS-REFERENCE TO RELATED APPLICATIONS

The present application is a continuation of International Application No. PCT/JP2018/015572, filed on Apr. 13, 2018, and based upon and claims the benefit of priority from Japanese Patent Applications No. 2017-090061, filed on Apr. 28, 2017, and No. 2018-014928, filed on Jan. 31, 2018, the entire contents of which are incorporated herein by reference.

TECHNICAL FIELD

The disclosure relates to a solid object printing system and a solid object printing method.

BACKGROUND ART

As a conventional solid object printing apparatus for printing an image on a solid object, there is known a printer which includes a recording head of an inkjet system and a solid object support for rotatably supporting the solid object while a side surface of the solid object opposes to a nozzle surface of the recording head, thereby printing an image on the side surface of the solid object by the recording head while rotating the solid object by the solid object support (see JP 2006-335019 A).

SUMMARY

In the conventional solid object printing apparatus, since it is constructed so that a single solid object is rotatable on the solid object support, the production efficiency when performing printing on a plurality of solid objects is low.

In the conventional solid object printing apparatus, additionally, it is necessary to appropriately control the rotation of a solid object as the printing target to improve the quality of printing. For that reason, there is a problem of requiring complicated and precise control technology, thereby causing the cost to be increased.

Furthermore, a method using a printing jig has also been proposed as a conventional solid object printing method. However, such a printing method requires a printing jig for each of solid objects of different shapes, and also requires time and effort to fix the solid object to the printing jig. Therefore, there is a problem of increasing the cost required for printing.

In view of the above circumstances, an object of the present application is to provide a solid object printing system and a solid object printing method that do not require rotation control of a solid object and also enable high-definition printing without using a fixing jig.

In order to solve the above-described problems, a solid object printing system according to a first aspect of the present application includes: a print table configured to mounting a solid object to be subjected to printing; a detection unit configured to detect a position and an orientation of the solid object mounted on the print table; a print data generation unit configured to generate print data corresponding to the solid object on a basis of a detection result of the position and the orientation of the solid object performed by the detection unit; a print unit configured to perform printing on the solid object by the print data generated by the print data generation unit; and a control unit configured to control the operations of the detection unit, the print data generation unit and the print unit.

A solid object printing method according to a second aspect of the present application includes: a detection process of detecting a position and an orientation of a solid object mounted on a print table; a print data generation process of generating print data corresponding to the solid object on basis of the detected position and the detected orientation of the solid object; and a printing process of performing printing on the solid object by the generated print data.

With the aspects of the present application, it is possible to provide the solid object printing system and the solid object printing method that do not require rotation control of a solid object and also enable high-definition printing without using a fixing jig.

BRIEF DESCRIPTION OF THE DRAWINGS

FIG. 11 is a schematic configuration diagram illustrating a belt-conveyor type printing table applied to the solid object printing system according to the first embodiment.

FIG. 19 is a flowchart illustrating a processing procedure of correction processing executed by the solid object printing system according to the second embodiment.

FIG. 24 is an explanatory diagram illustrating the relationship between the scanning direction of a scanning print head and the flying angles of ink droplets, and the like.

DETAILED DESCRIPTION

Figure 1:
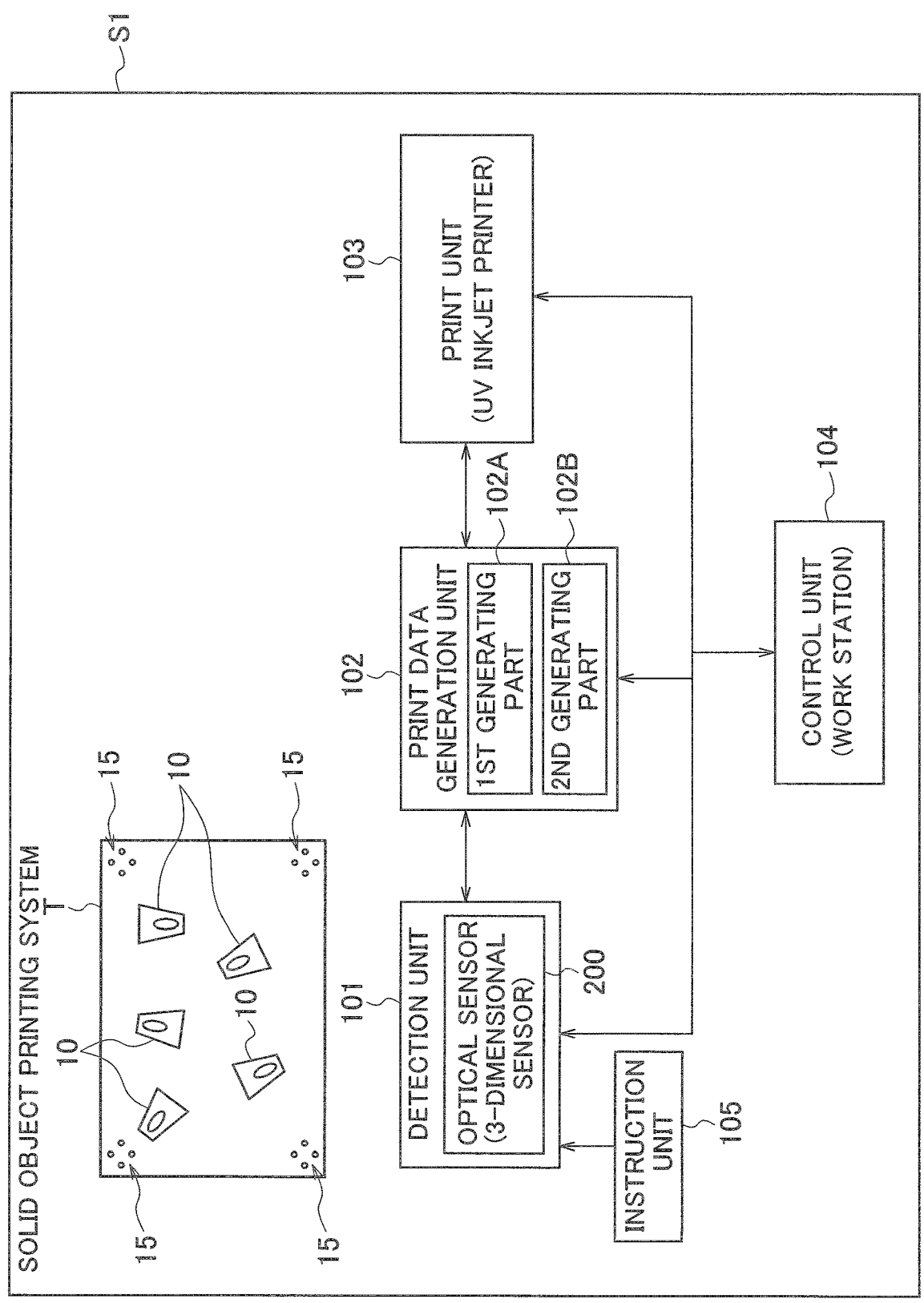
FIG. 1 is a functional block diagram illustrating a whole configuration of a solid object printing system according to a first embodiment.

Hereinafter, embodiments will be described in detail with reference to drawings. Here, in the attached drawings, the same members are indicated with the same reference numerals respectively, and overlapping descriptions are omitted.

First Embodiment

A configuration example of a solid object printing system S1 according to a first embodiment will be described with reference to FIGS. 1 and 2.

Figure 2:
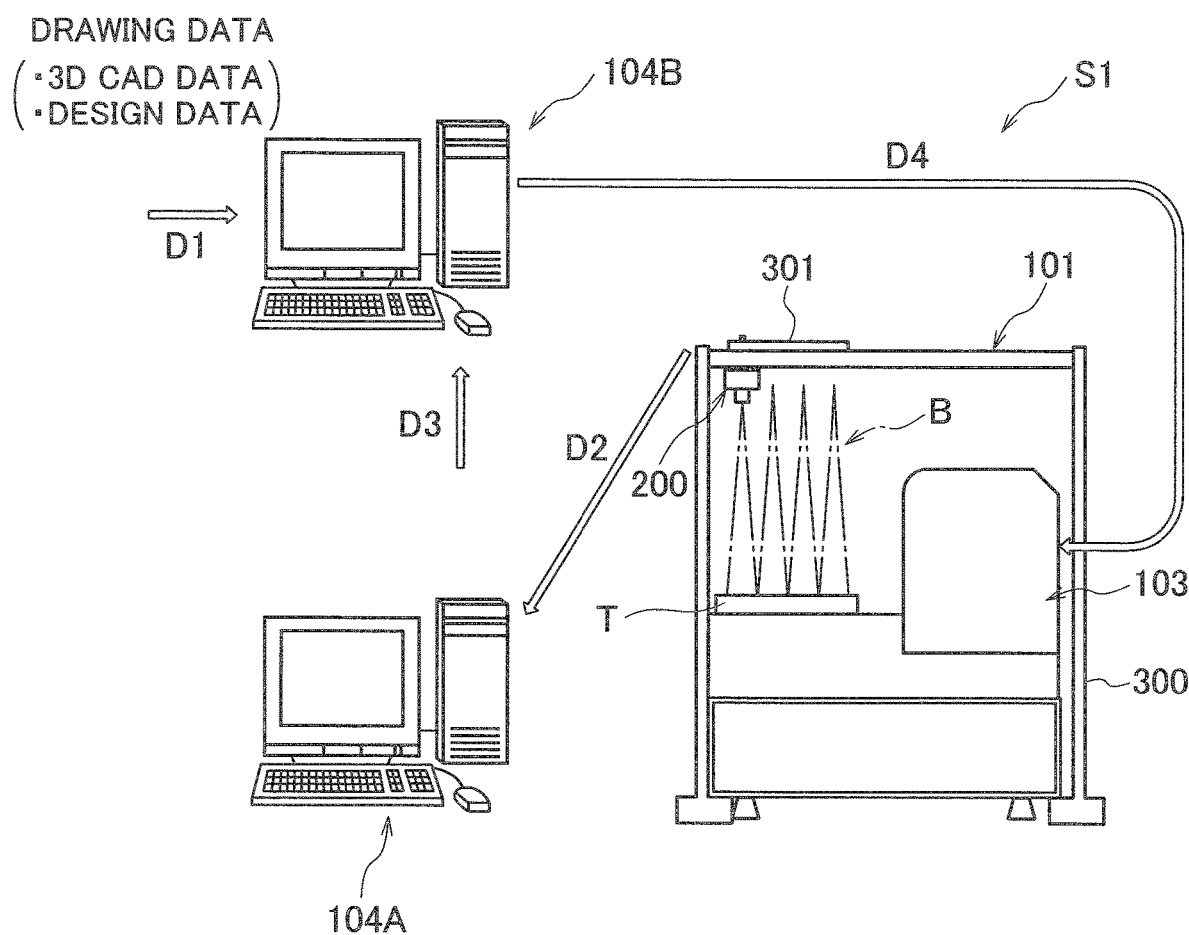
FIG. 2 is an explanatory diagram illustrating a configuration example of the solid object printing system according to the first embodiment.

FIG. 1 is a functional block diagram illustrating the whole configuration of the solid object printing system according to the first embodiment, and FIG. 2 is an explanatory diagram illustrating a configuration example of the solid object printing system according to the first embodiment.

As illustrated in FIG. 1, the solid object printing system S1 according to the first embodiment includes a print table T for mounting one or more solid objects 10 to be printed, a detection unit 101 for detecting the position and orientation of each of the solid objects 10 mounted on the print table T, a print data generation unit 102 for generating print data corresponding to each of the solid objects 10 on the basis of the detection result by the detection unit 101, a print unit 103 for performing printing on each of the solid objects 10 according to the print data generated by the print data generating unit 102, and a control unit 104 for controlling respective operations of the detection unit 101, the print data generation unit 102, and the print unit (e.g. a flat-bed type UV inkjet printer) 103.

The detection unit 101 includes, for example, a predetermined optical sensor or an optical sensor (three-dimensional sensor) 200 that acquires the three-dimensional posture information of each of the solid objects 10 mounted on the print table T.

On the print table T, there are printed, in its four corners, detection references 15 which can be detected by the optical sensor 200.

The detection unit 101 includes an instruction unit 105 including an XY slider 301 and the like that instructs a plurality of detection points on the surface of the solid object 10 in advance. In FIG. 2, reference symbol E in denotes a light beam, and reference symbol 300 denotes a housing of the print unit 103.

The detection unit 101 detects the position of a detection point instructed for each of the solid objects 10 by the instruction unit 105 and also the positions of the detection references. The control unit 104 including workstations 104A, 104B and the like calculates the position and the rotation angle of each of the solid objects 10 on the print table T on the basis of the detected position of the detection point and the positions of the detection references.

By pattern-matching based on both data about the calculated position and rotation angle of each of the solid objects 10 and previously-acquired data about the posture of each of the solid objects 10, the control unit 104 can determine the posture of each of the solid objects 10.

The print data generation unit 102 can be configured by the workstation 104B as hardware and predetermined data processing software or the like.

The print data generation unit 102 includes a first data generating part 102A for generating first print data (drawing data) based on the posture of each solid object 10 determined by the control unit 104 and the drawing information to be printed on the surface of each of the solid objects 10, and a second data generating part 102B for generating second print data which is obtained (for optimization) by applying a rotation process on the first print data according to the position and rotation angle of each of the solid objects 10 detected by the detection unit 101.

The solid object printing system S1 may further include a height detection unit (not illustrated) for detecting the height of each of the solid objects 10 mounted on the print table T. In this case, the print data generation unit 102 could correct the second print data on the basis of the height information of each of the solid objects 10 detected by the height detection unit.

When the optical sensor 200 is configured by a three-dimensional sensor that acquires three-dimensional posture information of each of the solid objects 10 mounted on the print table T, the first data generating part 102A may be adapted so as to generate the first print data on the basis of the detection result by the three-dimensional sensor, and the second data generating part 102B may be adapted so as to apply the rotation process on the first print data according to the position and rotation angle of each of the solid objects 10 acquired by the three-dimensional sensor or any detection means other than the three-dimensional sensor, thereby generating the so-optimized second print data.

The optical sensor 200 may be configured to detect the printing state on the surface of each of the solid objects 10, and the control unit 104 may be configured to judge whether the printing is good or not, based on the detection result of the printing state.

(Re. Process of the First Data Generation Unit)

Next, the process of the first data generating part 102A will be described in detail.

First, it is performed to input both 3D-CAD data having the three-dimensional shape information about the solid object 10 and design data having the information about coloring and drawing applied to the surface of the solid object 10, to the first data generating part 102A.

Inputted to the first data generating part 102A is the 3D-CAD data in which the posture information on the print table T is also included.

Besides, on an operation screen of the work station 104B constituting the first data generating part 102A, an operator can instruct and determine the most stable posture on the print table T from the 3D-CAD data Next, the first data generating part 102A combines the 3D-CAD data corresponding to the solid object posture information on the print table T and the drawing information to thereby extract two-dimensional rendering data under the condition of a parallel-light fluoroscopic image.

Then, the first data generating part 102A generates the first print data (drawing data) from the so-extracted two-dimensional rendering data and depth information corresponding to the rendering data.

More specifically, since the printing apparatus is generally configured to print two-dimensional data on a flat surface, its printing characteristics for a depth away from the flat surface are different from the printing characteristics onto the flat surface. Assuming that this depth printing characteristics different from the flat-surface printing characteristics is stored in advance, it is performed to generate optimal drawing data from depth information corresponding to rendering data, with reference to the stored characteristics.

In case of the inkjet printer, for example, the printing characteristics for depth depends on the flight characteristics of an ink droplet. Therefore, in order to compensate for the disturbance of the printing characteristics that is caused since the impact accuracy of an ink droplet gets worse at a relatively distant position, it is required for a deep contour portion to extend the rendering data thereby optimizing the drawing data.

(Generation Procedure of Print Rendering Data)

The generation procedure of print rendering data in the solid object printing system S1 according to the first embodiment will be described with reference to FIGS. 3 to 5.

In the first embodiment, a mascot doll D1 is illustrated as the solid object 10 to be printed.

Figure 3:
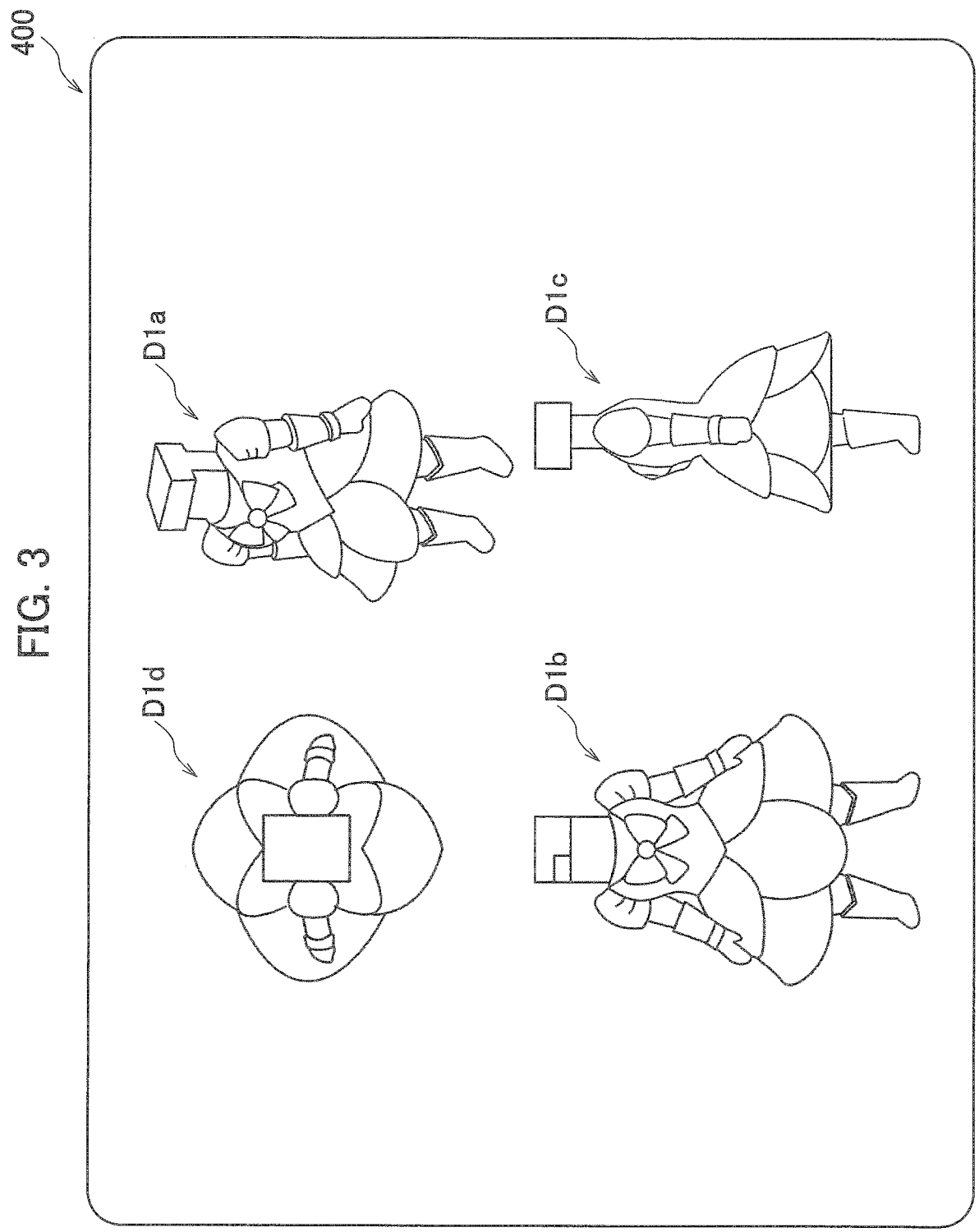
FIG. 3 is an explanatory diagram illustrating a generation procedure of print rendering data.

In the generation procedure illustrated in FIG. 3, the posture of the mascot doll D1 is determined since an operator uses a pointing device, such as a mouse, to manipulate the orientations etc. of mascot dolls D1a to D1d on an operation screen 400 of the workstation 104B constituting the first data generating part 102A.

Figure 4:
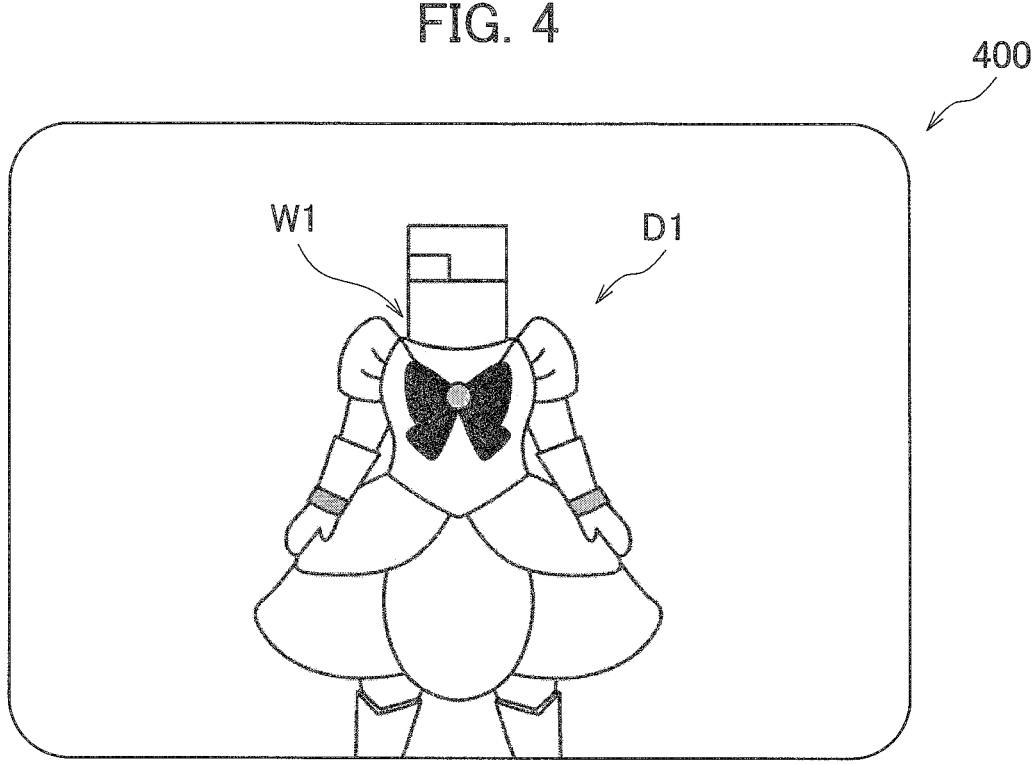
FIG. 4 is an explanatory diagram illustrating a continuation of the generation procedure of print rendering data.

Next, in the generation procedure illustrated in FIG. 4, the 3D-CAD data of the mascot doll D1 in the determined posture and its design data (e.g. costume design data in the example illustrated in FIG. 4) W1 are combined on the operation screen 400 of the workstation 104B.

Figure 5:
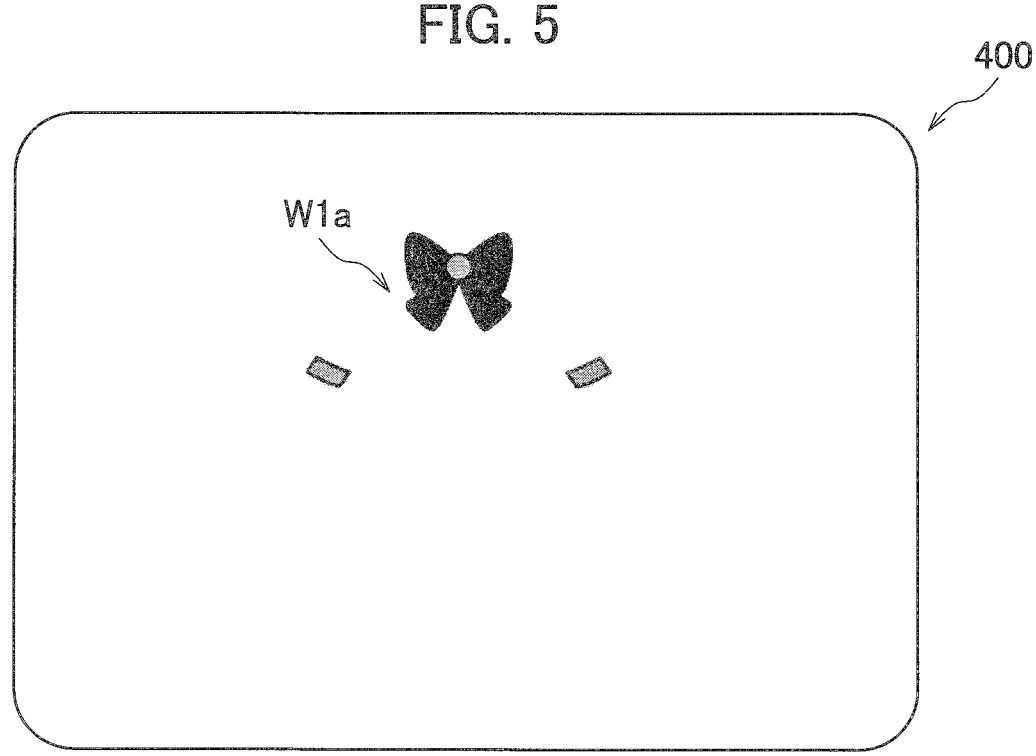
FIG. 5 is an explanatory diagram illustrating a continuation of the generation procedure of print rendering data.

In the generation procedure illustrated in FIG. 5, two-dimensional rendering data is extracted under condition of the parallel-light fluoroscopic image, and the drawing data W1a is extracted from this two-dimensional rendering data and its corresponding depth information by the first data generating part 102A.

(Re. Specific Example of Detection Unit)

Next, an example of a reading device as the detection unit 101 will be described with reference to FIG. 2 and the like.

In the example illustrated in FIG. 2, the reading device (detection unit) 101 includes an XY slider 301 disposed on the upper face side of the housing 300 accommodating such as the flat-bed type UV inkjet printer (printing unit) 103, and the optical sensor 200 including a digital camera movable in both X and Y directions by the slider 301.

Here, it is necessary that the print data for the UV inkjet printer 103 is generated at a position coinciding with the position of the solid object 10 on the print table T.

Provided that the drawing position accuracy of the UV inkjet printer 103 is set to 200 μm as a target value based on the previous investigation result, the reading device 101 is capable of detecting the position of the solid object 10 on the print table T with an accuracy rate of 100 μm and also its rotation angle with an accuracy rate of 1 degree.

The optical sensor 200 includes, for example, a digital camera having 24.78 million pixels. The XY slider 301 moves the digital camera so that images are captured in respective detection areas A1 to A8 (see FIG. 7 etc.) obtained by dividing the printing table T into eight sections.

Owing to the processing of the reading software installed in the workstation 104B, it is performed to designate a reference point (its specific example will be described later) of the solid object 10 by the digital camera and also calculate the position of the solid object 10 on the print table and its rotation angle by the reading result.

By controlling acceleration/deceleration of the XY slider 301 so that an error does not occur in the read image by the influence of vibration etc. at imaging, preferably, the moving time of the slider among the detection areas is set from 1 to 4 seconds in view of achieving both shortening of the detection time and reading accuracy.

In case of using the digital camera of 24.78 million pixels, the size of the print table T is set to "30 cm×42 cm".

Under these conditions, the size of each detection area A1 to A8 in one imaging is set to "15 cm×10.5 cm" from the relationship between the size of the printing table T corresponding to the reading area and the reading resolution.

On the XY slider 301 for moving on a plane parallel to the plane of the print table T, the digital camera is arranged at the level of approximately 80 cm from the print table T.

In view of printing accuracy, it is important to reduce an error that may occur since the height dimension of the solid object 10 mounted on the print table T dose not match the position of the solid object 10 on the print table T, depending on a photographic viewing angle.

Although a correcting calculation is available for the height that could be grasped in advance, it is required to reduce the viewing angle in principle, in view of eliminating the influence of the dimensional error of the solid object 10 or the three-dimensional posture error etc.

That is, it is preferable in design to make the viewing angle less than 5.7 degrees so that the influence of 0.5 mm in the height error falls in the range of 0.05 mm in the reading error.

(Re. Reading Reference Mark and Pattern Matching Based on Printing Standard)

The reference point of the positional information on the print table T of the solid object 10 read by the digital camera needs to be matched with the printing reference with high accuracy.

Figure 8:
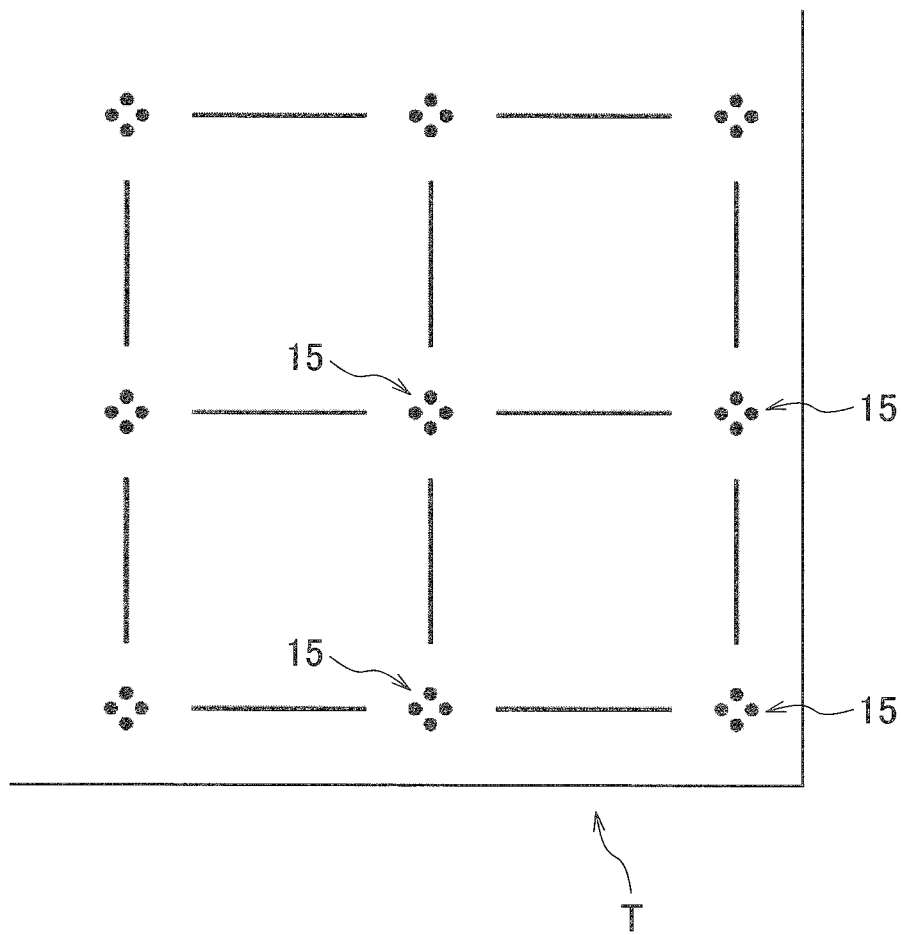
FIG. 8 is an imaging view illustrating an example of detection reference marks.

Therefore, it is performed to fix a printing sheet on the print table T and subsequently, reference marks (detection reference) 15 as illustrated in FIG. 8 are printed on the printing sheet.

Then, the positional relationship among these reference marks 15 and the solid object 10 on the print table is determined from the photographing information, thereby generating the print data to be printed on the solid object 10 on the print table T.

Figure 7A:
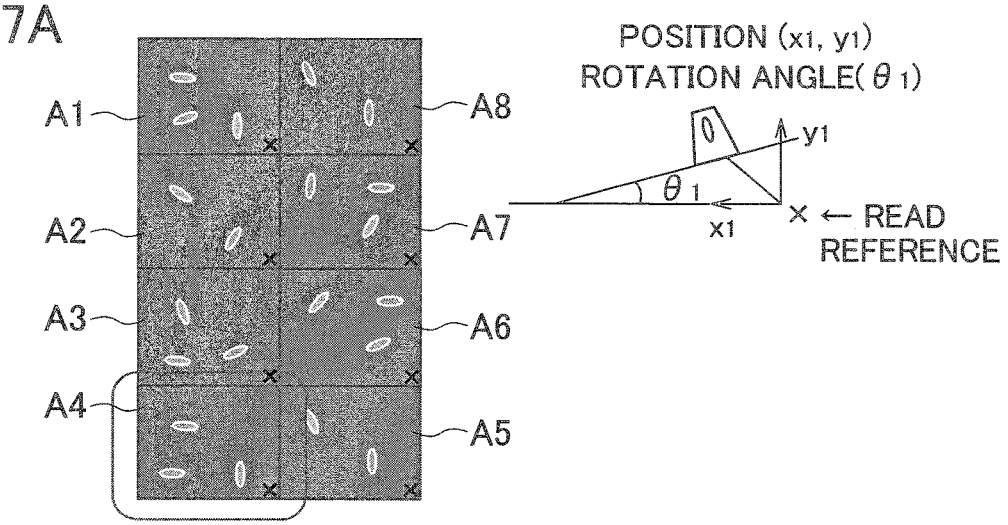
FIGS. 7A to 7C are explanatory diagrams illustrating an example of a generation procedure of print data.
Figure 7B:
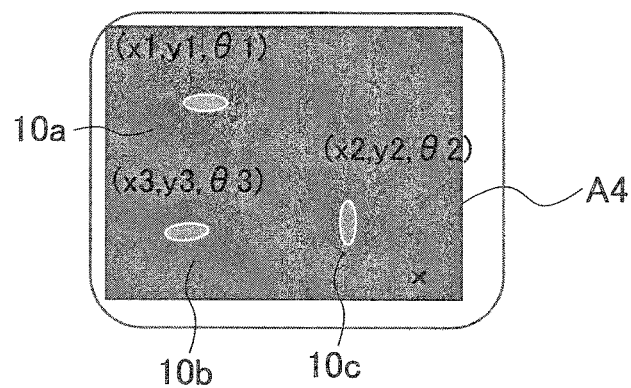
Figure 7C:
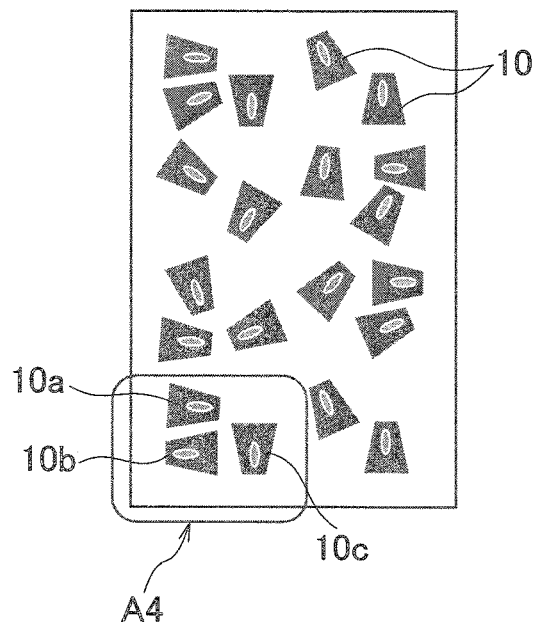

More specifically, for example, as illustrated in FIG. 7, a PET film having the same size as the print table T of A3 (297 mm×420 mm) size is prepared and fixed on the print table T. Then, a detection mark is printed for each of detection areas A1 to A8.

Further, in the example illustrated in FIGS. 8 to 10, four circles are printed at equal distances on a cross line having the reference point of each detection area as an intersection point.

Then, the detection unit 101 detects these four circles by means of pattern matching, thereby obtaining a center point of the four circles. Next, the center point is connected to an opposing center point with a straight line. The reference point is determined by an intersection point of so-formed straight lines.

As a result, the printing reference of the printing unit 103 can be matched with the reference mark 15 (detection reference) printed on the printing sheet fixed on the print table T with high accuracy.

Also, in order to determine the position of each of the solid objects 10 and its rotation angle (i.e. rotation angle within a plane of the print table T) from the photographing information by the digital camera with high accuracy and in a short time, feature points (of two or more positions) about the contour information of the solid object 10 are designated as detection points, and the pattern-matching processing is carried out.

Figure 6A:
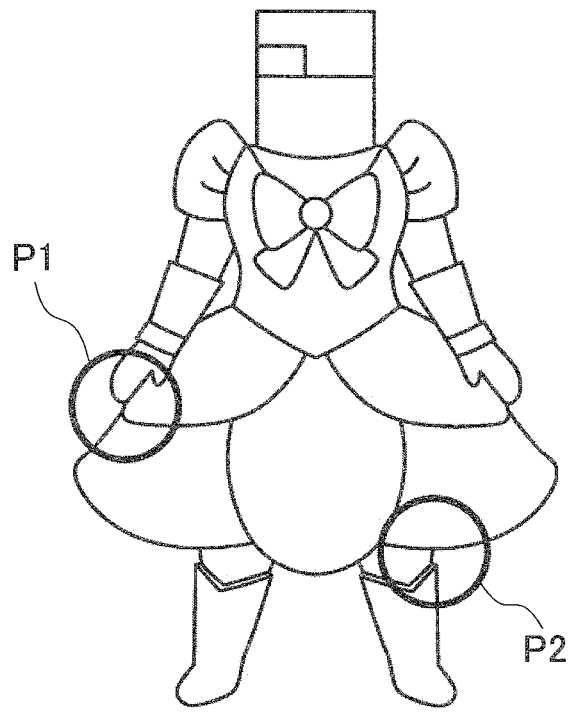
FIGS. 6A and 6B are explanatory diagrams illustrating a procedure for finding detection reference points by pattern matching.

That is, in the example illustrated in FIG. 6A, the contour information of the solid object 10 is acquired in advance, and contour feature points P1 and P2 of two positions are designated as the detection points.

Figure 6B:
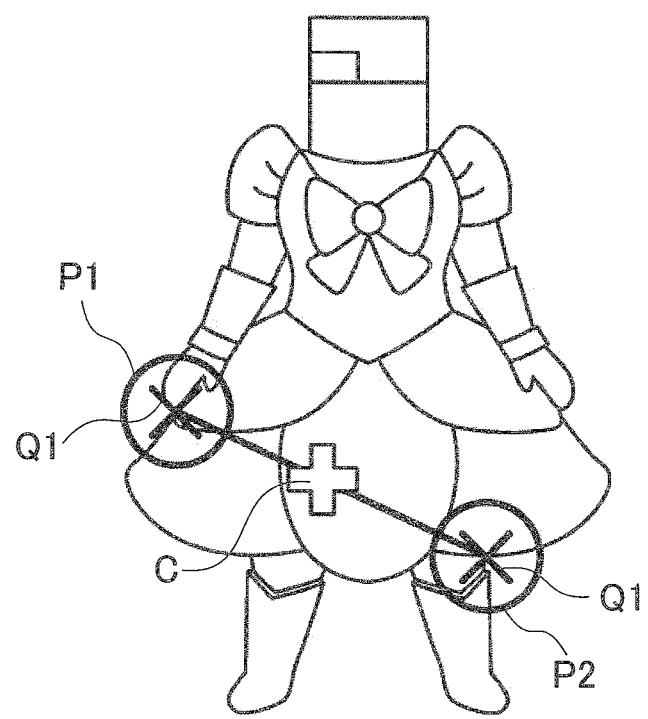

Next, by pattern matching, the read reference points Q1, Q2 are extracted from the read image information by the digital camera (see FIG. 6B).

Then, after extracting the two read reference points Q1, Q2, the gravity center position C of the solid object and its rotation angle θ1 are determined.

Using such contour data, as illustrated in FIGS. 6B and 7A, two or more read reference points are designated so as to detect the position on the print table T of the solid object 10 and its posture (the rotation angle θ1 within a plane of the print table T).

In the example illustrated in FIG. 7A, two to three solid objects 10 are mounted on the detection areas A1 to A8 of the print table T, in random directions.

Here, we now pick up the detection area A4 as an example. Regarding each of the solid objects 10a to 10c, for example, for the solid object 10a, its position (x1, y1) and its rotation angle (θ1) can be determined on the basis of the read reference point according to the illustrated method on the right side of FIG. 7A (see FIG. 7B).

Then, the above-acquired information about respective positions and the rotation angles (θ1) of all the solid objects 10 arranged on the print table T is transferred to the first data generating part 102A that generates first print data (drawing data).

Next, the second data generating part 102B generates the second print data that has been optimized by applying the rotation processing on the first print data according to the position (x1, y1) and the rotation angle (θ1) of each solid object 10.

When generating the second print data, it is possible to regard the positional relationship with the data reference point when printing the read reference point, as matching or a prescribed value. Consequently, the reading-out determination position can be matched with the printing position with high accuracy.

In the example illustrated in FIG. 7A, the respective solid objects are mounted inside the respective detection areas A1 to A8 of the print table T. Nevertheless, even if one solid object is mounted at a location extending over the detection areas A1 to A8, each processing is made possible by combining the detection areas with each other.

Even in the case of a plurality of solid objects or drawing data, it is possible to perform high-precision printing as well by applying this embodiment.

(Execution Example of Printing)

Figure 9A:
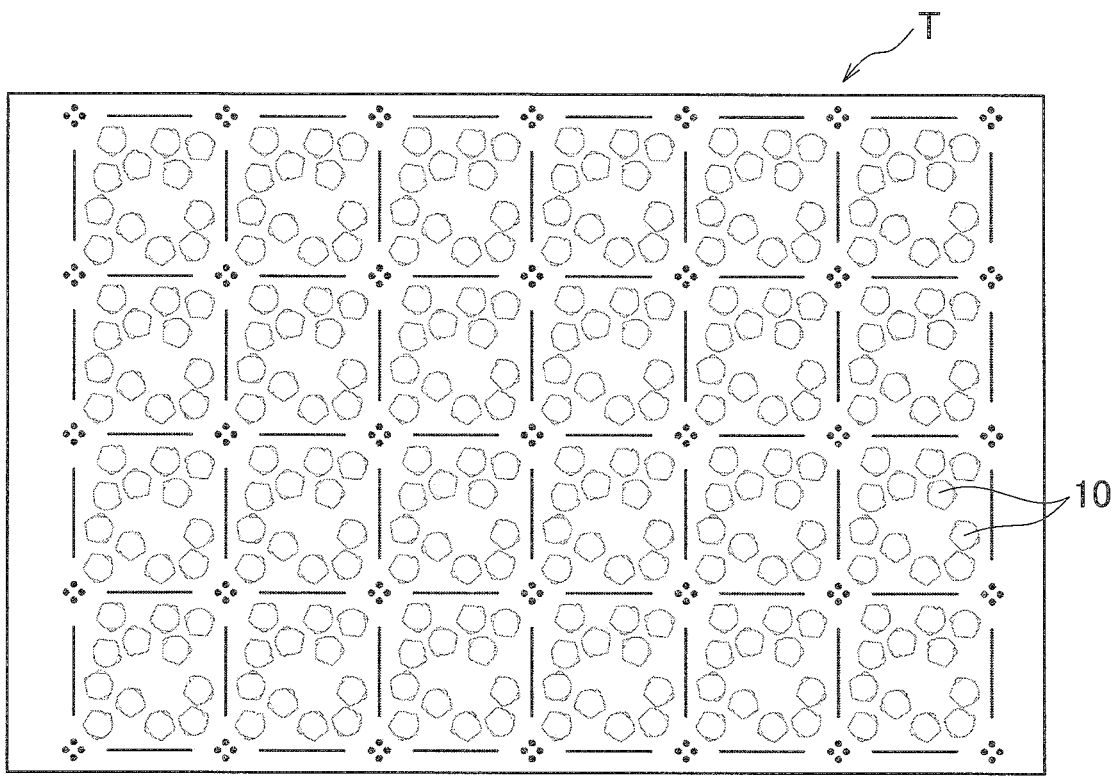
FIGS. 9A and 9B are explanatory diagrams illustrating printing example for solid objects.
Figure 10A:
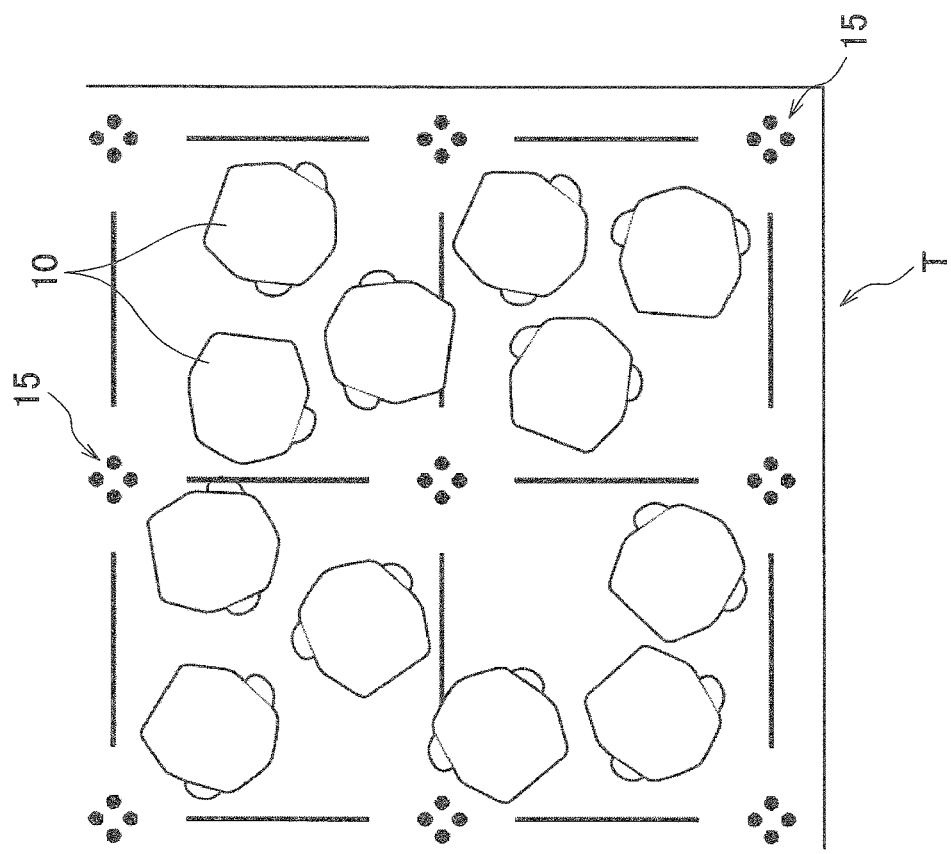
FIGS. 10A and 10B are partially enlarged views illustrating the printing examples for solid objects.

First, as illustrated in FIGS. 9A and 10A, a plurality of solid objects 10 are arranged on the print table T.

At this time, as long as the solid objects 10 are arranged on the print table T under condition of maintaining the posture determined in advance, the rotation angles and positions within the plane of the print table T are optional. Also, the number of solid objects 10 is not limited as long as they could be arranged on the print table T.

Figure 9B:
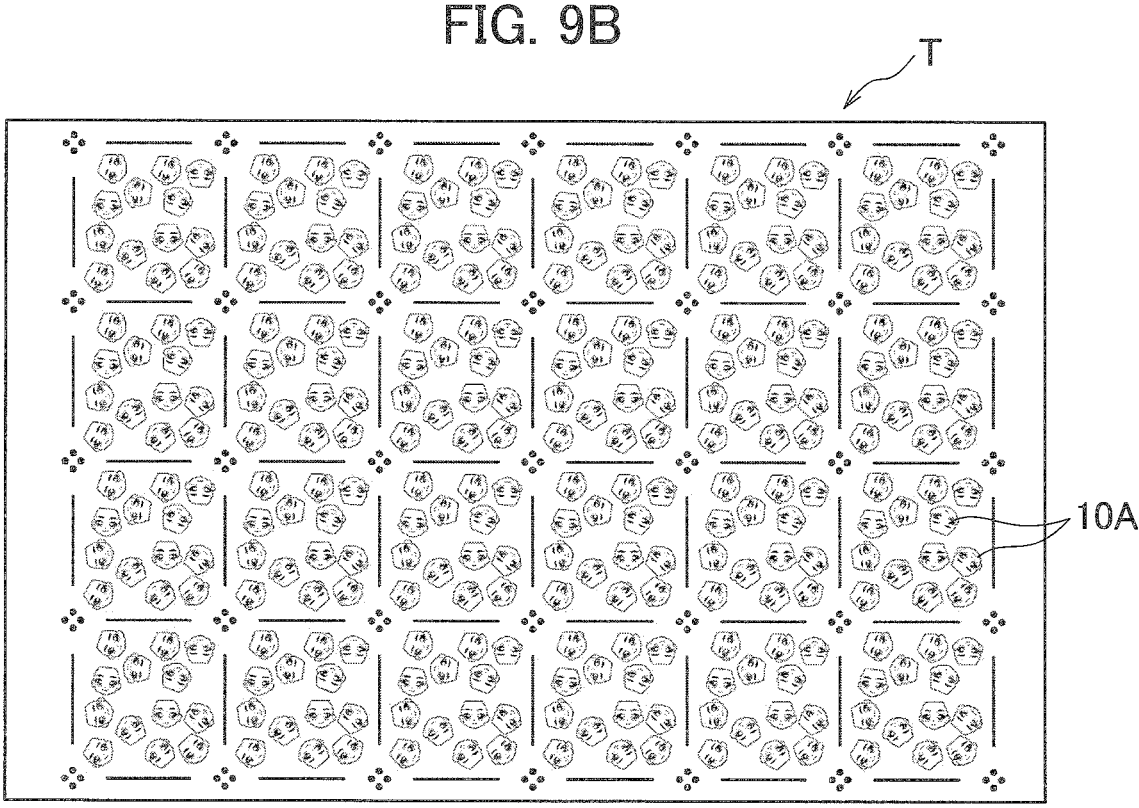
Figure 10B:
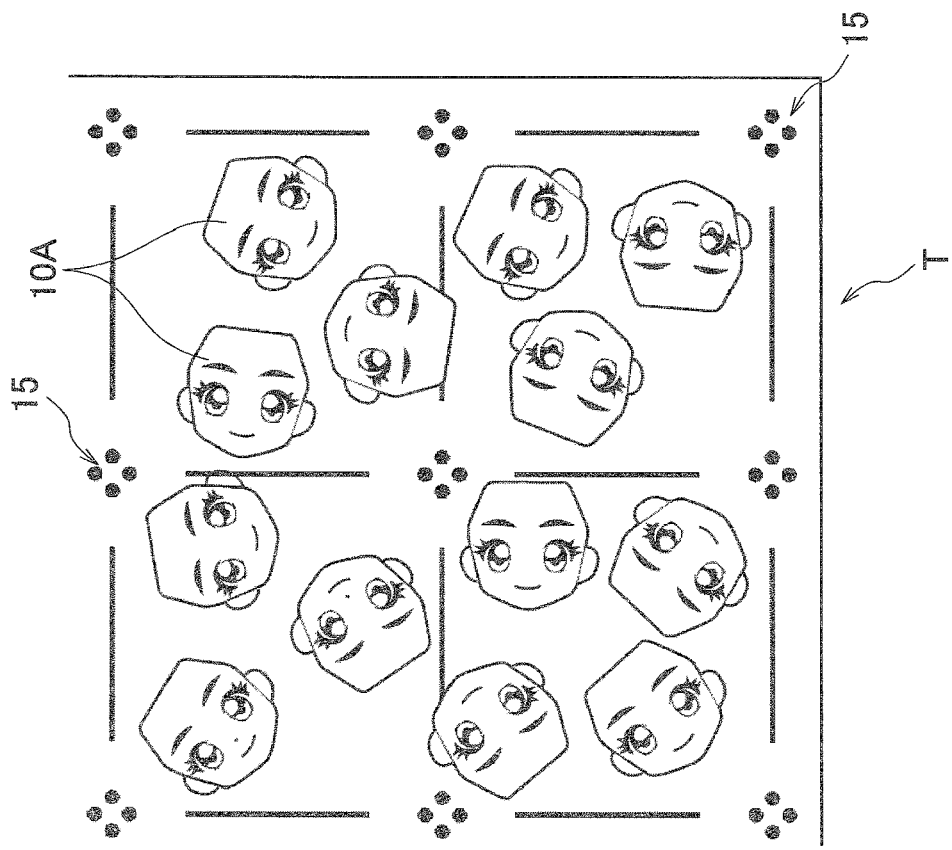

Then, by the method as described above, it is performed to detect the position and the rotation angle of each solid object 10 and subsequently drive the printing unit 103 by the print data produced on the basis of the detection result, thereby perforating printing on each solid object 10. Consequently, there can be obtained printed matters 10A as illustrated in FIG. 9B and FIG. 10B.

Further, in the solid object printing system S1 according to the first embodiment, the printing table T may be configured by a belt conveyor 700 including a belt (for example, an endless track-like belt) B which is movable from an upstream side to a downstream side by placing the solid objects 10 thereon, as illustrated in FIG. 11.

The belt B is moved in a direction of "D11" (to the right direction in FIG. 11) by a driving device (not illustrated).

On the surface of the belt B, there are printed a plurality of detection references (reading reference marks) 15 which can be detected by the detection unit (optical sensor) 200.

Here, the detection unit 200 is disposed on the upstream side of the inkjet printer (printing unit) 103. Besides, in FIG. 11, reference numeral 10A indicates a solid object on which a predetermined printing has been performed by the printing unit 103.

Second Embodiment

A configuration example of a solid object printing system S2 according to a second embodiment will be described with reference to FIGS. 12 to 25.

In the solid object printing system S2 according to the second embodiment, constituents similar to those of the solid object printing system S1 according to the first embodiment are indicated with the same reference numerals respectively, and their overlapping descriptions will be omitted.

Figure 12:
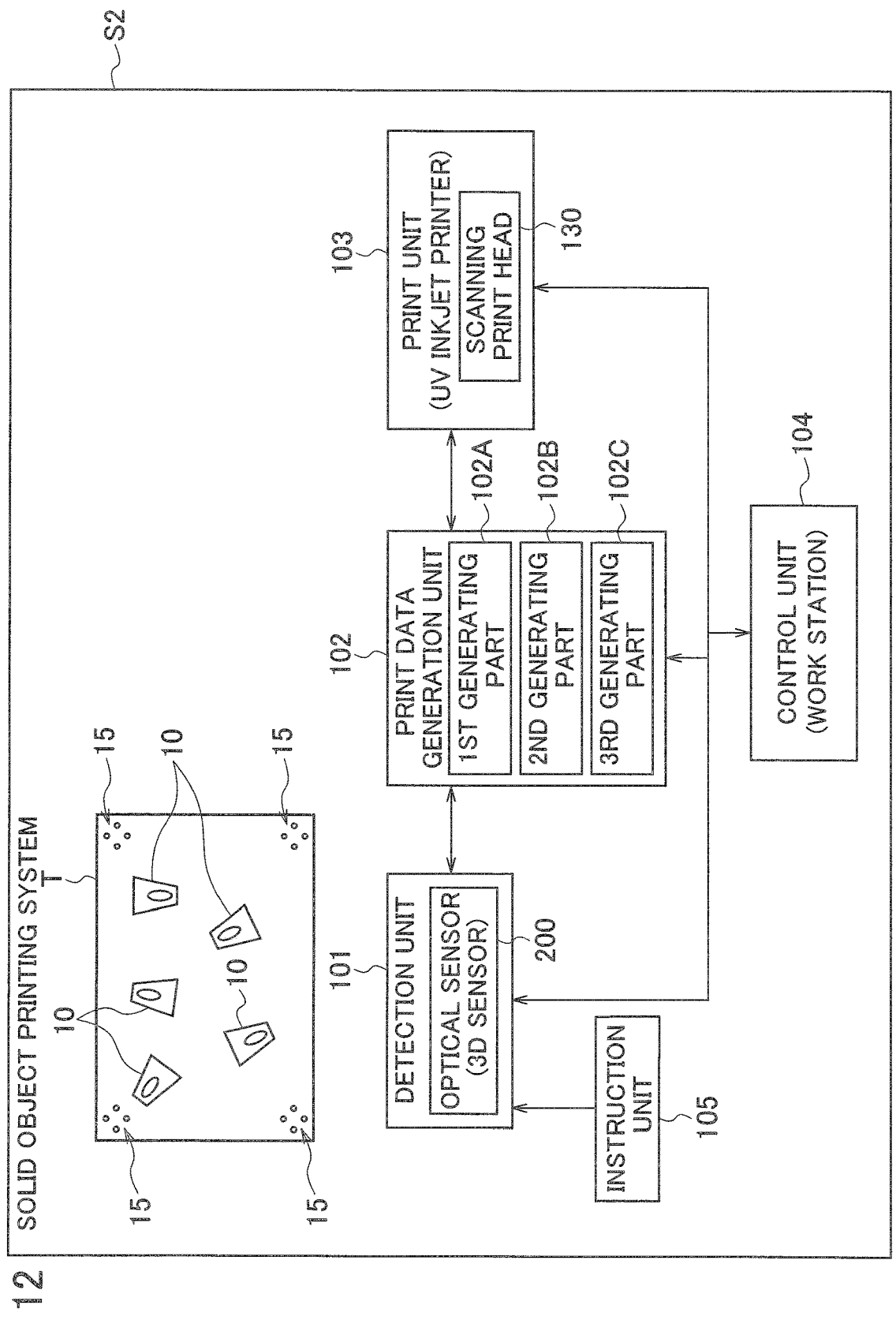
FIG. 12 is a functional block diagram illustrating the whole configuration of a solid object printing system according to a second embodiment.
Figure 13:
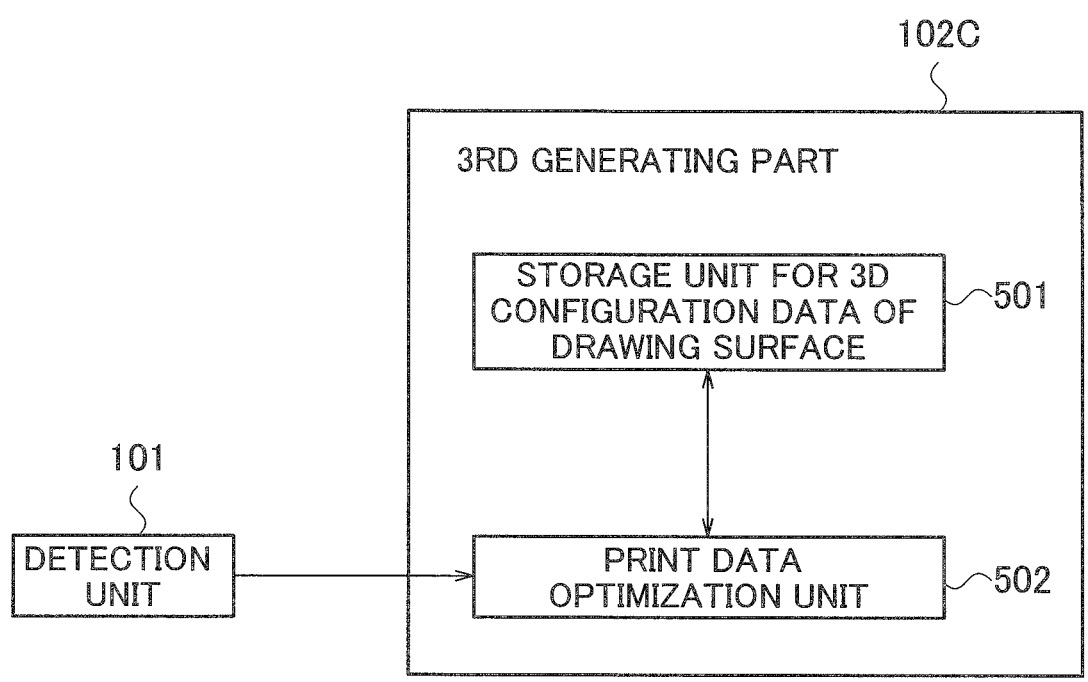
FIG. 13 is a block diagram illustrating the configuration of an essential part of the solid object printing system according to the second embodiment.

Here, FIG. 12 is a functional block diagram illustrating the whole configuration of the solid object printing system S2 according to the second embodiment, and FIG. 13 is a block diagram illustrating the configuration of an essential part of the solid object printing system S2 according to the second embodiment.

As illustrated in FIG. 12, the solid object printing system S2 according to the second embodiment differs from the solid object printing system S1 according to the first embodiment in that the print data generation unit 102 includes a third data generating part 102C in addition to the first data generating part 102A and the second data generating part 102B and that the printing unit 103 includes a scanning print head 130.

The scanning print head 130 moves on the printing table while sequentially scanning it at high speed, thereby allowing the printing to be performed over the whole surface of the print table at high speed.

Figure 24:
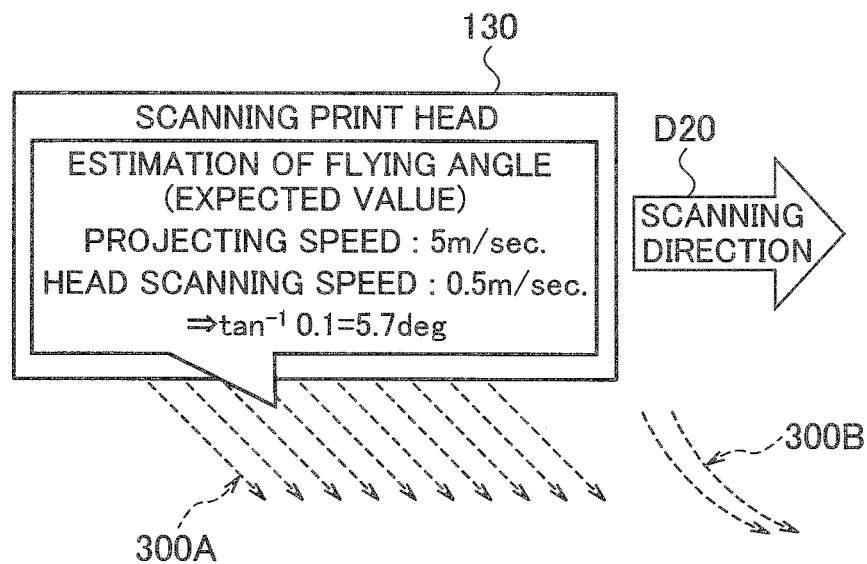

Now, as illustrated in FIG. 24, when the scanning print head 130 is, for example, a printing unit configured to scans in the scanning direction D20 at high speed, ejected ink droplets 300A fly obliquely.

For example, if the projecting speed of an ink particle is 5.0 m/sec and the scanning speed of the scanning print head 130 is 0.5 m/sec, then the estimated value (expected value) of the flying angle of the ink particle becomes $\tan^{-1}(0.5/5.0)$, that is, $\tan^{-1} 0.1 = 5.7$ deg.

Also, as illustrated in FIG. 24, due to the influence of air flow accompanied with the scanning of the scanning print head 130, there is the possibility that the ink droplets 300A have curved trajectories like those of ink droplets 300B.

Thus, due to the influence of the flying angle of ink, when the surface of a solid object is curved, the landing position of the ink droplet 300B having a curved trajectory is made different from the landing position of that onto a flat surface, thereby affecting the linearity and dimensional accuracy.

Figure 25:
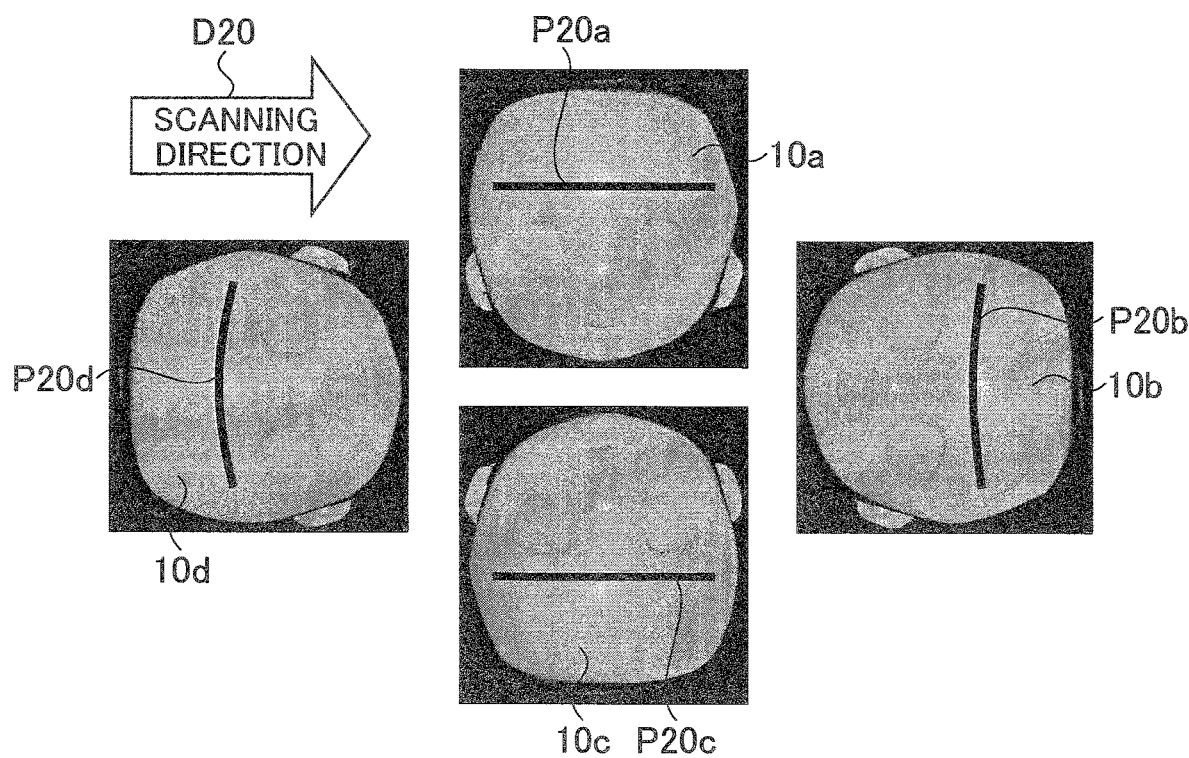
FIG. 25 is an explanatory diagram illustrating the scanning direction of the scanning print head and an example of printing.

In the example illustrated in FIG. 25, linear prints P20a to P20d are applied to the solid objects 10a to 10d whose orientations are changed every 90 degrees, provided that the scanning direction of the scanning print head 130 is a direction of "D20".

As a result, it is illustrated that the linearity is maintained in the linear prints P20a, P20c whose printing directions are substantially parallel to the direction D20.

On the other hand, it can be seen that the linearity is lost in the linear prints P20b, P20d whose printing directions are substantially orthogonal to the direction D20.

Therefore, in the solid object printing system S2 according to the second embodiment, the printing unit 103 includes the inkjet-type scanning print head 130, and the print data generation unit 102 includes the third data generating part 102C that generates optimized print data on the basis of the flying angles of ink particles (ink droplets) ejected from the scanning print head 130 and the configuration of the drawing surface of each solid object.

Then, the control unit 104 including such as a work station controls the operation of the printing unit 103 on the basis of the print data optimized by the third data generating part 102C.

As a result, in the solid object printing system S2 according to the second embodiment, it is possible to allow the ink droplets ejected from the scanning print head 130 to be landed on desired positions, thereby improving the printing accuracy.

As illustrated in the block diagram of FIG. 13, the third data generating part 102C includes a storage unit (for example, a flash memory etc.) 501 for storing three-dimensional configuration data of a drawing surface, and a print data optimization unit 502. The third data generating part 102C is realized by, for example, cooperation of hardware, such as CPU and RAM, and software that executes correction processing and the like. Details of the correction processing will be described later.

In the solid object printing system S2 according to the second embodiment, as illustrated in FIG. 11, the printing table T may be configured by the belt conveyor 700 including the belt (for example, an endless track-like belt) B which is movable from an upstream side to a downstream side by placing the solid objects 10 thereon.

In the solid object printing system S2 according to the second embodiment, the three-dimensional sensor 200 includes a two-dimensional sensor 200A configured by a digital camera etc., and an illumination unit 250 configured by an LED light etc. that illuminates the solid object 10.

Figure 14:
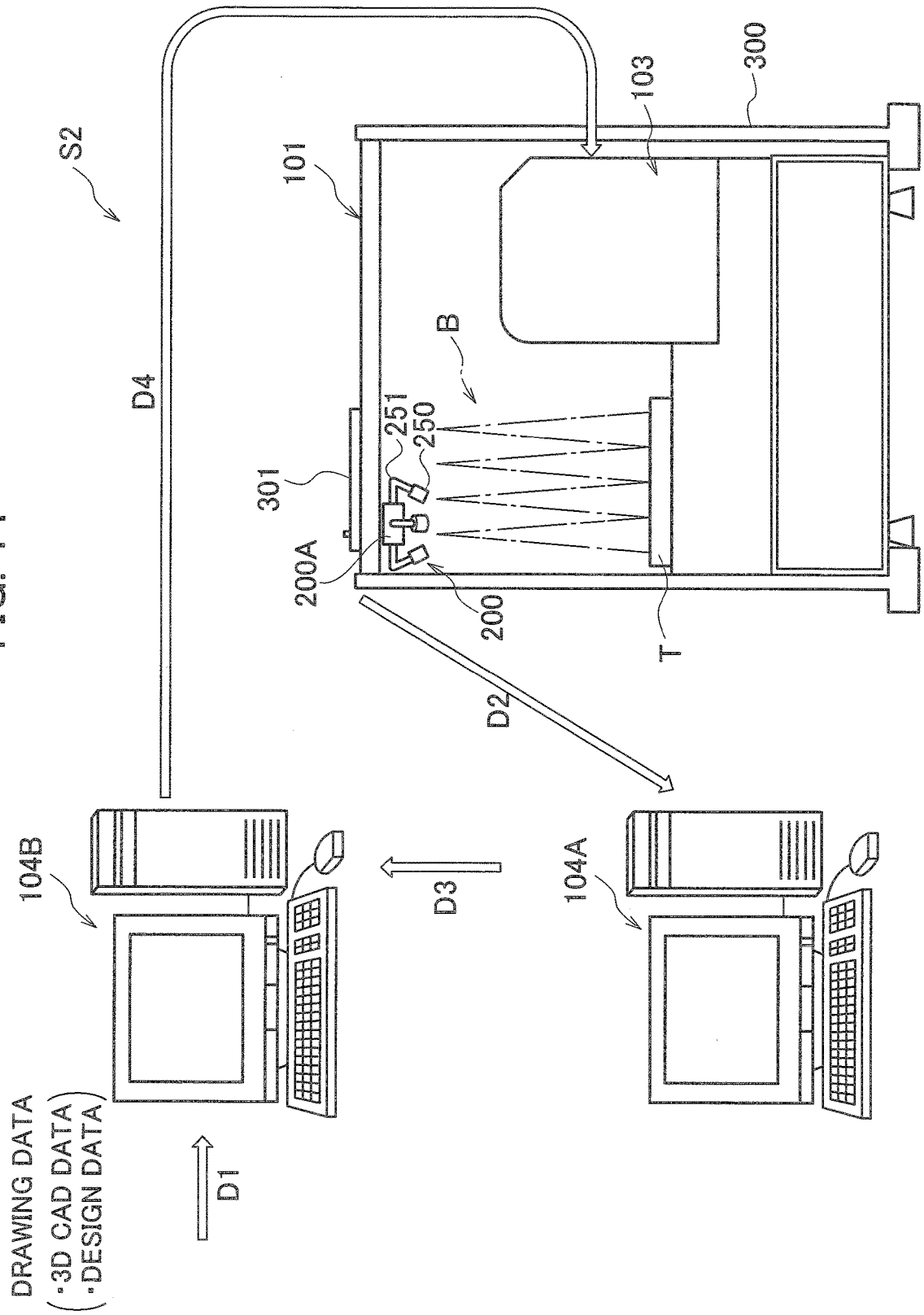
FIG. 14 is an explanatory diagram illustrating a configuration example of the solid object printing system according to the second embodiment.
Figure 15A:
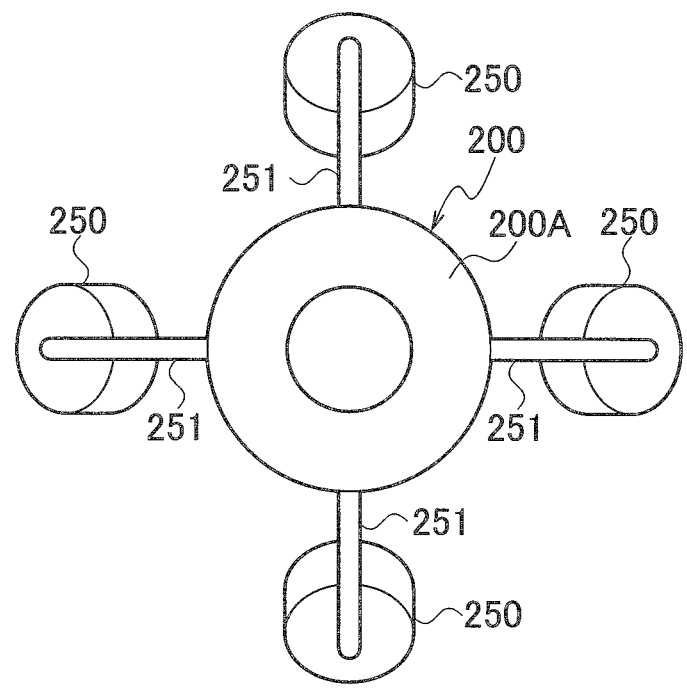
FIGS. 15A and 15B are schematic configuration diagrams illustrating configuration examples of an essential part of the solid object printing system according to the second embodiment.

In the configuration example illustrated in FIGS. 14 and 15A, four LED lights as the illumination unit 250 are provided around the two-dimensional sensor 200A at every 90 degrees through arm members 251.

It is preferable that the illumination unit 250 includes a plurality of LED lights, for example, five or more LED lights from the viewpoint of applying a predetermined shading to grasp the posture of a solid object.

Figure 15B:
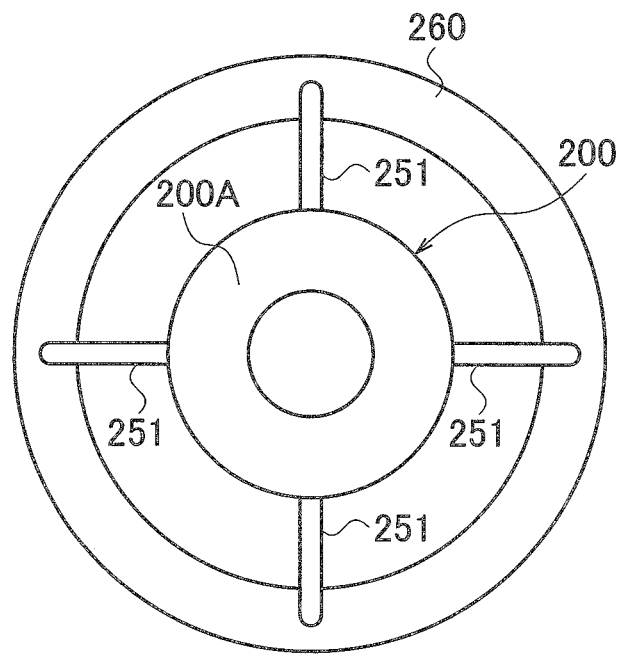

Further, as illustrated in FIG. 15B, an illumination unit 260 where a plurality of LEDs etc. are arranged annularly may be attached to the circumference of the two-dimensional sensor 200A through the arm members 251.

The two-dimensional sensor 200A detects the shadow of the drawing surface of the solid object 10 formed by the illumination unit 250 (260), thereby acquiring the three-dimensional posture of the solid object 10.

Figure 16:
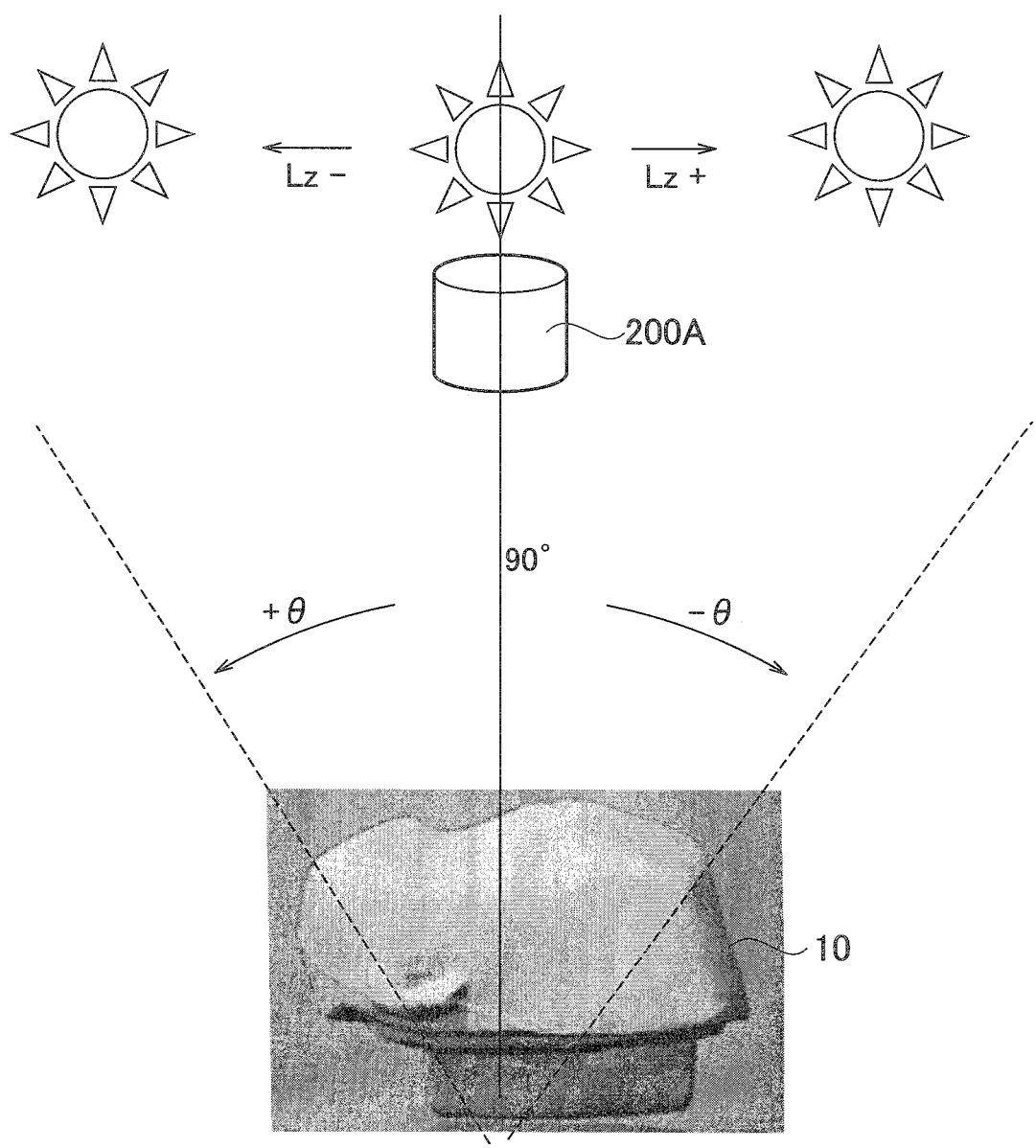
FIG. 16 is an explanatory diagram illustrating a principle of detecting a three-dimensional posture.
Figure 17:
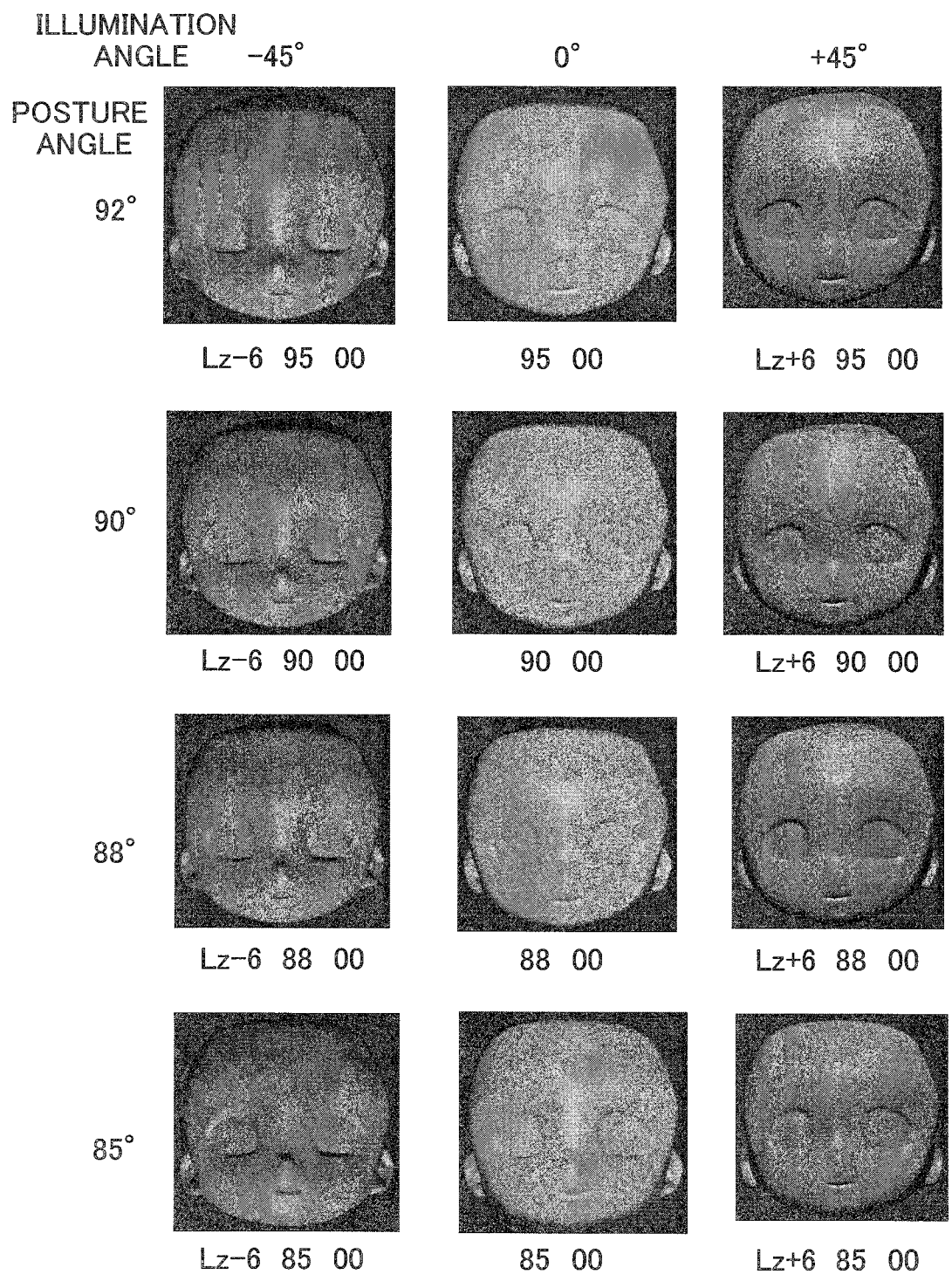
FIG. 17 is an explanatory diagram illustrating examples of illumination angles and posture angles in detection of the three-dimensional posture.
Figure 18A:
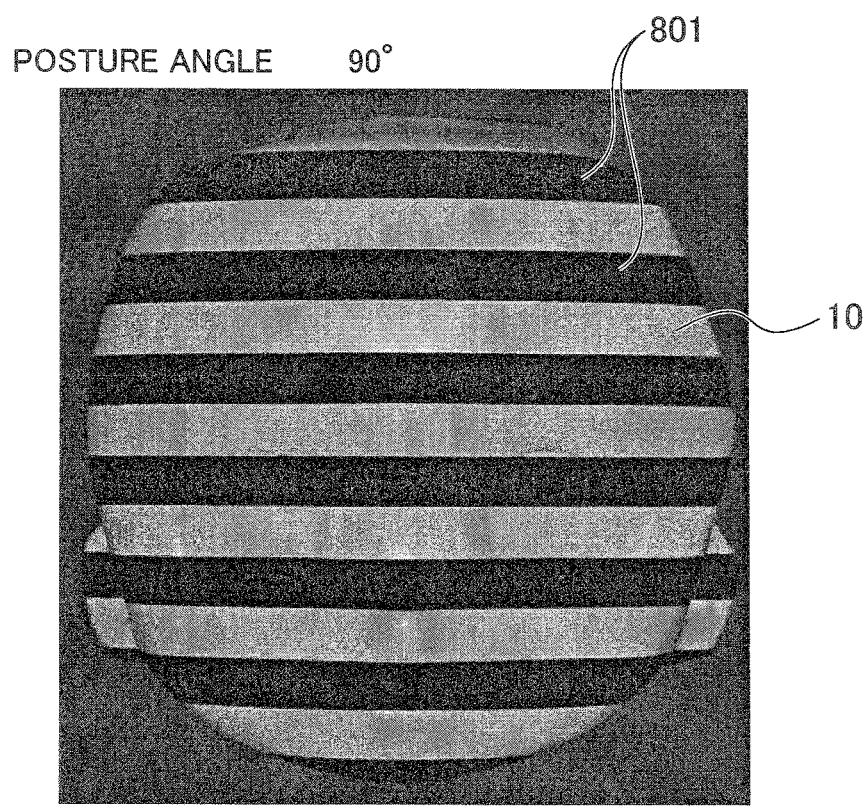
FIGS. 18A and 18B are explanatory diagrams illustrating another example of the illumination angle and the posture angle in the detection of the three-dimensional posture.
Figure 18B:
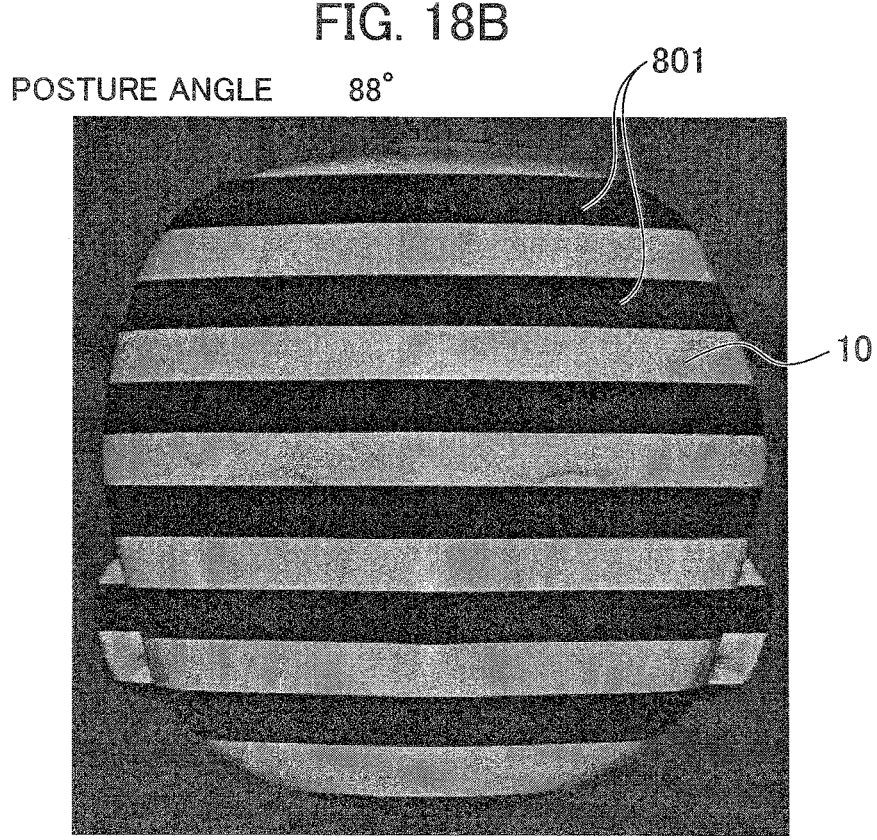

Here, FIG. 16 is an explanatory diagram illustrating a principle of detecting the three-dimensional posture, and FIG. 17 is an explanatory diagram illustrating an example of an illumination angle and a posture angle in detection of the three-dimensional posture, and FIGS. 18A and 18B are explanatory diagrams illustrating another example of the illumination angle and the posture angle in the detection of the three-dimensional posture.

As illustrated in FIG. 16, it is assumed that the irradiation angle to the solid object 10 when the light of the illumination unit 250 is positioned on the right side of the figure (i.e. a direction of Lz+) is represented by $-\theta$, while the irradiation angle to the solid object (for example, a face part of a doll) 10 when the light of the illumination unit 250 is positioned on the left side of the figure (i.e. a direction of Lz−) is represented by $+\theta$.

Then, as illustrated in FIG. 17, concavo-convex shadow patterns (by the combination of the illumination angle and the posture angle) of the solid object 10 at predetermined illumination angles (for example, −45 degrees, 0 degree, +45 degrees) are acquired into a database, and stored into a flash memory or the like.

Thus, for example, when the concavo-convex shadows of the solid objects 10 placed on the belt B of the belt conveyor 700 illustrated in FIG. 11 are acquired by the detection unit 200 and further collated with a pattern made into a database, it is possible to detect a three-dimensional angle (three-dimensional posture) of each solid object 10.

Alternatively, the patterns of shading change of the solid object 10 in the vertical direction and the horizontal direction (so-called "XYZ-directions") may be acquired and subsequently converted into a database for storing although its illustration is omitted. Consequently, it is possible to detect the three-dimensional angle (three-dimensional posture) of each object more accurately.

Further, as illustrated in FIGS. 18A and 18B, it may be performed to irradiate predetermined light and dark patterns 801 to the solid objects 10, so that the three-dimensional angle (three-dimensional posture) of each solid object 10 can be detected from a change in the light and dark pattern to the solid object 10.

(Re. Optimization of Print Data)

Before describing details of the correction processing, we now explain a mechanism of correction (optimization) of the print data in the solid object printing system S2 according to the second embodiment.

The solid object printing system S2 according to the second embodiment employs a printing apparatus having the inkjet-type scanning print head 130 as the printing unit 103.

Therefore, due to the movement of the scanning print head 130 in the scanning direction and the influence of the air flow, the trajectories along which ink particles ejected from the scanning print head 130 fly are different from the trajectory just below the vertical.

Besides, for example, if the projecting speed of an ink particle is 5.0 mm/sec and the scanning speed of the scanning print head 130 is 0.5 mm/sec, then the estimated value (expected value) of the flying angle of the ink particle becomes $\tan^{-1}$ (0.5/5.0), that is, $\tan^{-1} 0.1 = 5.7$ deg.

In the printing operation on the solid object 10, additionally, it is necessary to cause the ink particles to be landed on the positions of different heights (that is, the surface of a solid object having unevenness) accurately.

That is, if printing is performed while projecting the printing data produced for a two-dimensional printing object (for example, printing paper etc.) onto a solid object as it is, the landing position of the ink particle deviates from the original target position, thereby causing a problem that a desired print result cannot be obtained.

Accordingly, for the purpose of obtaining a desired print result for the solid object 10, there is the need to generate the print data optimized by performing correction in consideration of the ink particles' trajectories, the deviation of the particles' landing positions of different heights, and the like.

Therefore, in the solid object printing system S2 according to the second embodiment, the third data generating part 102C performs correction processing to generate the optimized print data on the basis of the flying angles of ink particles ejected from the scanning print head 130 and the configuration of the drawing surface of each solid object 10.

(Re. Correction Processing)

The processing procedure of the correction processing performed by the solid object printing system S2 according to the second embodiment will be described with reference to the flowchart of FIG. 19 and the explanatory diagrams of FIGS. 20 to 23

When the correction processing is started, it is firstly executed to acquire a plane rotation angle of the solid object 10 by the detection unit 101, and the process goes to step S11.

At step S11, it is executed to read out the original design data paired with the three-dimensional data in pixel units from the storage device etc. of the control unit 104.

Here, it is noted that the original design data corresponds to basic print data that is obtained by the plane projection method, in the standard posture of the solid object 10. In the coordinates illustrated in FIG. 20, hatched pixels (area) PD1 correspond to the basic print data.

Figure 20:
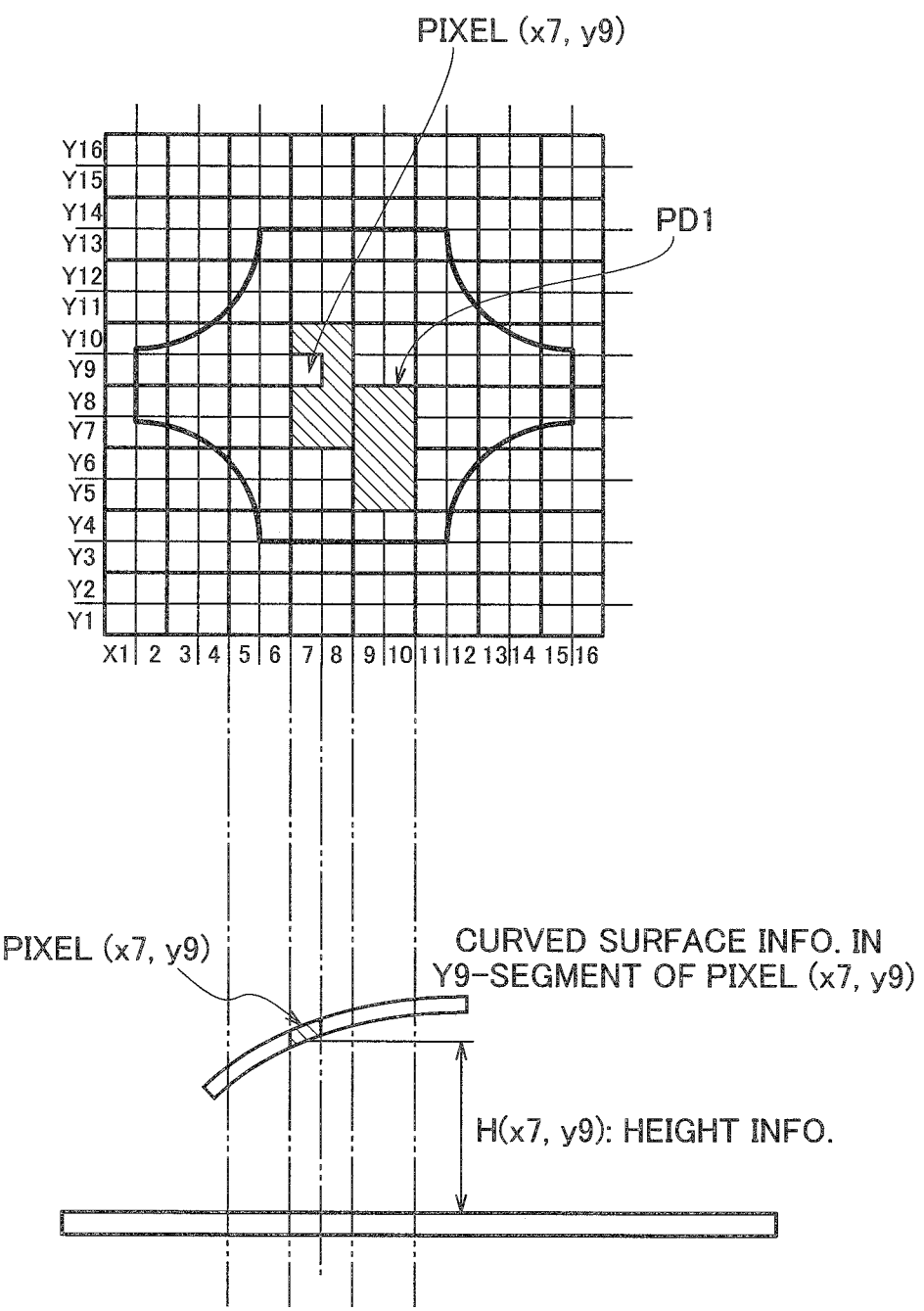
FIG. 20 is an explanatory diagram illustrating a generation procedure of correction data in the correction processing.

The basic print data is configured by data that associates, for each pixel (e.g. pixels (x7, y9) in the example of FIG. 20), its height information H and curved-surface information including adjoining pixels (e.g. curved surface information in segment "y9" of the pixel (x7, y9) in the example of FIG. 20). The basic print data is also stored in the storage device etc. of the control unit 104.

At step S12, it is executed to detect the three-dimensional posture of the solid object 10 from a displacement angle of the standard posture and subsequently, the process goes to step S13.

At step S13, it is executed to predict the ink landing position by the ink flying angle for each pixel.

Figure 21A:
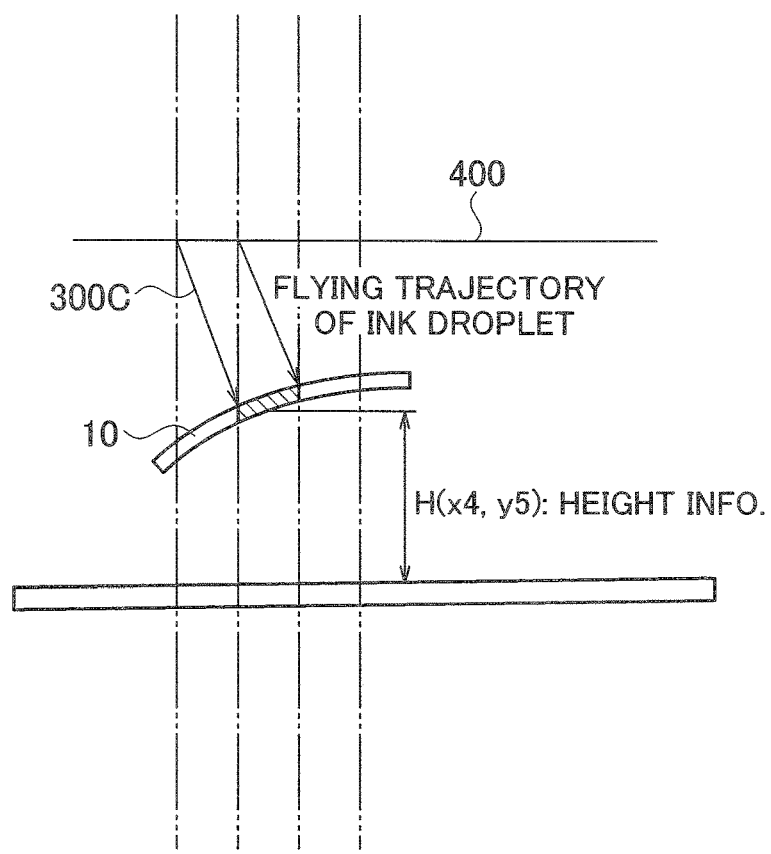
FIGS. 21A and 21B are explanatory diagrams illustrating a generation procedure of correction data in the correction processing.
Figure 21B:
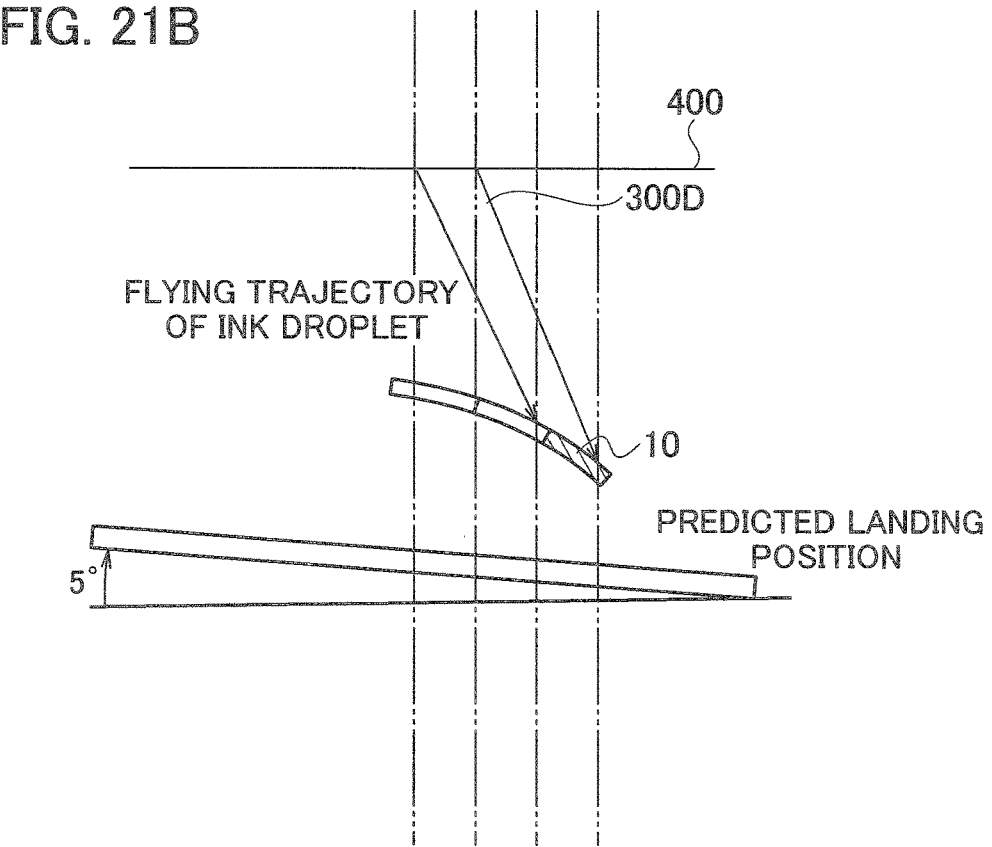

The illustrations of FIGS. 21A and 21B illustrate predictive examples of the ink landing position when there are detected a plane rotation angle of 180 degrees and a displacement (5 degrees on the x axis) in the displacement angle of the three-dimensional posture of the solid object 10.

As illustrated in these prediction examples, when the plane rotation angle is 180 degrees and the three-dimensional posture is 5 degrees, it can be seen that the flying distances of the ink droplets become longer, so that the resultant landing positions are elongated further than the standard positions.

In the examples illustrated in FIGS. 21A and 21B, since the printing surface of the solid object 10 is shaped into a convex surface and the heights (a distance from the ink ejection surface 400) are different from each other, differences occur in the flying trajectories 300C, 300D of ink droplets and their landing positions.

Such a prediction of the ink landing position is performed for each pixel, thereby generating the prediction data about the ink landing position.

Next, at step S14, it is executed to calculate, for each pixel, a deviation between the prediction data of the ink landing position and the target landing position.

Figure 22A:
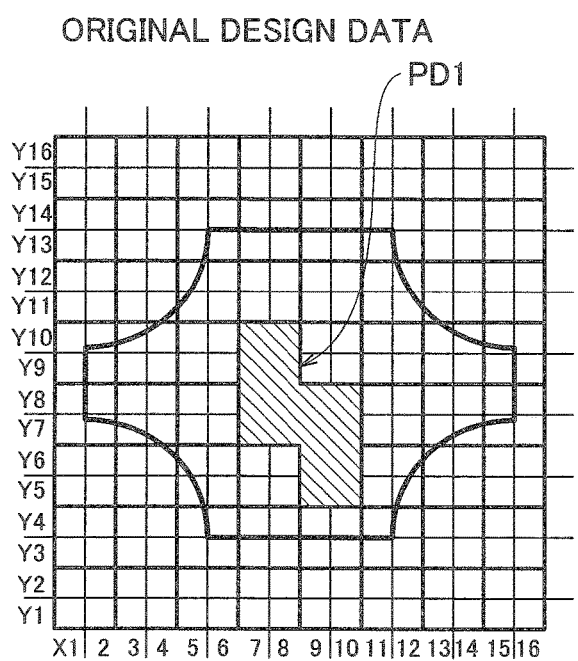
FIGS. 22A to 22C are explanatory diagrams illustrating a generation procedure of correction data in the correction processing.
Figure 22B:
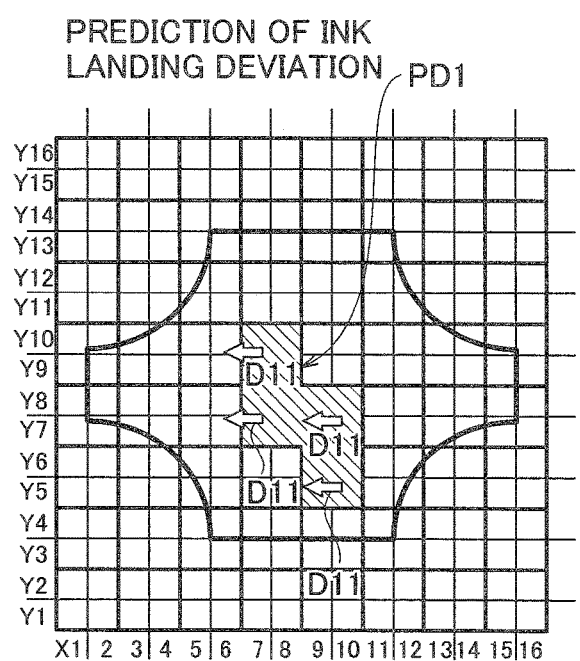
Figure 22C:
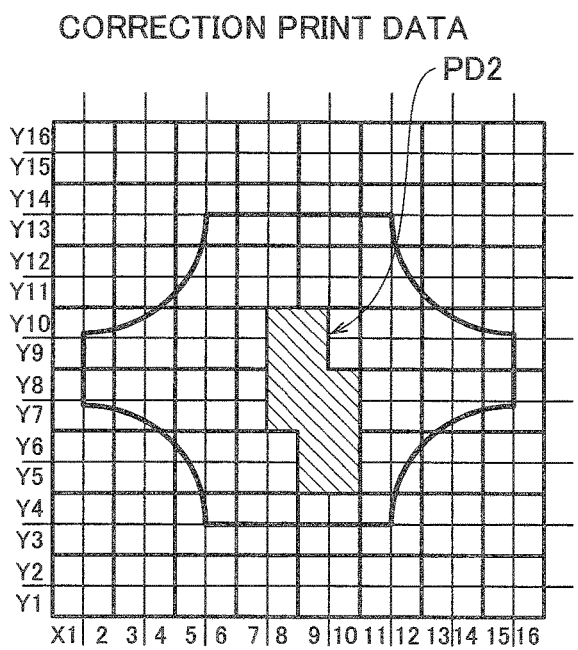

With respect to the original design data PD1 illustrated in FIG. 22A, for example, it is predicted that the ink landing position is deviated to the direction of "D11", as illustrated in FIG. 22B.

Next, at step S15, it is executed to generate the correction print data where the ink landing position is corrected so as to be the target landing position (for example, the correction print data PD2 illustrated in FIG. 22C), and the process is ended.

Besides, with respect to the calculation of a deviation between the prediction data of the ink landing position and the target landing position and also the calculation of generating the correction print data where the ink landing position is corrected, for performing these operations at high speed, the calculation results may be stored in a flash memory etc. in advance.

Figure 23:
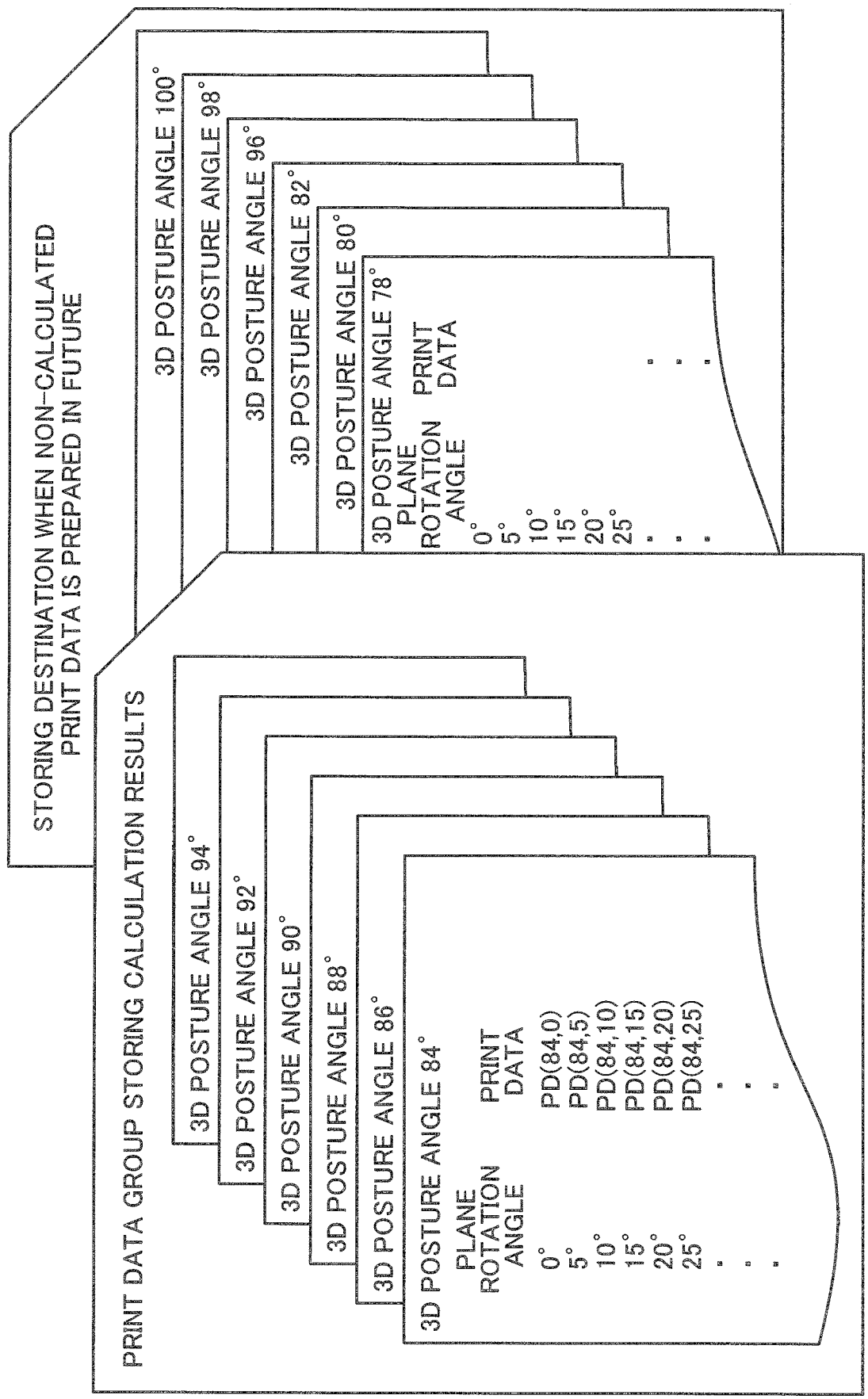
FIG. 23 is an explanatory diagram of an example of storing a group of print data.

That is, for example, as illustrated in FIG. 23, the calculation result where the plane rotation angle and the print data are associated with respect to each three-dimensional posture angle may be stored as a group of print data (correction print data) in a table format or the like, in a non-volatile memory, such as a flash memory, or a hard disk drive.

Further, in order to make the amount of the stored operation results in a practical scale for obtaining sufficient calculation accuracy, a plurality of stored calculation results may be supplemented with complement processing.

By performing printing on each solid object 10 with use of the so-generated correction print data, it is possible to apply the desired printing to a plurality of solid objects 10, which are sequentially transported by the belt conveyor 700 and also mounted thereon in random directions and inclinations, accurately.

Here, with respect to optimal print data corresponding to the relationship between the ink flying angle and the drawing surface configuration of the solid object 10, it may be performed to generate a group of optimal print data corresponding to each previously-prepared posture and store it in a storage device or the like.

Additionally, if data corresponding to the detected three-dimensional posture and plane rotation angle is missing in the group of optimal print data corresponding to each prepared posture, blank printing data (for example, a state where nothing is printed on a solid object) may be allocated on that particular solid object.

Furthermore, the calculation of missing data and its storing may be performed in parallel according to the history of a job producing the missing data. In this case, it is possible to promote the growth of the group of optimal print data by self-learning, thereby allowing the productivity to be improved.

As described above, according to the solid object printing system and the solid object printing method according to the embodiment, it is possible to eliminate trial and error to be performed to obtain a printed matter as in the related art and also possible to enhance the production efficiency.

Additionally, it is possible to perform high precision and high definition printing on a plurality of solid objects without using a printing jig, whereby the printing cost can be saved.

Although the invention made by the inventor has been specifically described on the basis of the embodiment, the embodiment disclosed in the present specification is only illustrative in all points and therefore, it should not be considered that the invention is limited to the disclosed technology. That is, the technical scope of the present invention is not to be restrictively interpreted on the basis of the descriptions in the above-mentioned embodiment, but to be interpreted in accordance with the descriptions of the claims only, and there may be included techniques equivalent to the technique described in the claims and all modifications within the scope of claims.

For example, the printing unit 103 is not limited to a UV inkjet printer and therefore, various printers adopting a variety of printing methods can be applied to the printing unit.

Also, the control unit 104 is not limited to a workstation, and a personal computer or the like may be used.

Further, when the three-dimensional sensor is composed of a illumination unit and a two-dimensional camera, the determination of the three-dimensional posture of the solid object 10 may be executed by a comparative calculation of shadow data of the drawing surface with previously-stored shadow data corresponds to the three-dimensional postures of the solid object.

Provided that the system includes a plurality of illumination units (LED lights 250, 260, etc.) having different irradiation angles against a solid object, additionally, the three-dimensional posture of the solid object may be detected from plural photographing results obtained by sequentially performing an illuminating process and a photographing process using the two-dimensional camera repeatedly.

What is claimed is:

1. A solid object printing system, comprising:
   a print table configured to mount a solid object to be subjected to printing;
   a plurality of detection references printed on the print table;
   a detection unit configured to detect positions of the plurality of detection references and positions of a plurality of detection points set on a surface of the solid object mounted on the print table;
   a print data generation unit configured to generate print data corresponding to the solid object mounted on the print table;
   a print unit configured to perform printing on the solid object by the print data generated by the print data generation unit; and
   a control unit configured to control the operations of the detection unit, the print data generation unit, and the print unit, wherein
   the control unit is configured to calculate a position and a rotation angle of the solid object mounted on the print table based on the positions of the plurality of detection references and the positions of the plurality of detection points detected by the detection unit, and
   the print data generation unit is configured to generate the print data corresponding to the solid object mounted on the print table based on the position and the rotation angle of the solid object mounted on the print table calculated by the control unit.

2. The solid object printing system of claim 1, wherein the detection unit includes an optical sensor.

3. The solid printing system of claim 1, wherein the solid object includes a plurality of the solid objects each mounted on the print table with an arbitrary position and an arbitrary rotation angle, and
   the control unit is configured to calculate a position and a rotation angle of each of the plurality of solid objects.

4. The solid object printing system of claim 3, wherein the detection unit includes an instruction unit configured to instruct the plurality of detection points in advance.

5. The solid object printing system of claim 1, wherein the control unit is configured to determine the posture of the solid object by pattern matching based on data about the position and the rotation angle of the solid object and previously-obtained data about the posture of the solid object.

6. The solid object printing system of claim 5, wherein the print data generation unit includes:
   a first data generation unit configured to generate first print data on a basis of the posture of the solid object determined by the control unit and drawing information to be printed on the surface of the solid object; and
   a second data generation unit configured to generate second print data that is optimized by performing rotation processing on the first print data corresponding to the position and rotation angle of the solid object detected by the detection unit.

7. The solid object printing system of claim 6, further comprising
   a height detection unit configured to detect a height of the solid object mounted on the print table, wherein
   the print data generation unit is configured to correct the second print data on a basis of the height of the solid object detected by the height detection unit.

8. The solid object printing system of claim 6, wherein the optical sensor includes a three-dimensional sensor configured to acquire three-dimensional posture information of the solid object mounted on the print table,
   the first data generation unit is configured to generate the first print data on a basis of a detection result by the three-dimensional sensor, and
   the second data generation unit is configured to generate the second print data that is optimized by performing the rotation processing on the first print data corresponding to the position and rotation angle of the solid object acquired by the three-dimensional sensor or the other detection unit.

9. The solid object printing system of claim 2, wherein the optical sensor is configured to detect a printing state on the surface of the solid object, and
   the control unit is configured to assess a printing result based on of a detection result of the printing state detected by the optical sensor.

10. The solid object printing system of claim 1, wherein the print table includes a belt conveyor having a belt on which the solid object is mounted and which can move from an upstream side to a downstream side.

11. The solid object printing system of claim 10, wherein the detection unit is disposed on the upstream side of the print unit.

12. The solid object printing system of claim 6, wherein the print unit includes a printing device provided with an inkjet-type print head,
   the print data generation unit further includes a third data generation unit configured to generate third print data optimized the second print data based on a flight angle of an ink particle ejected from the print head and a configuration of a drawing surface of the solid object, and the control unit is configured to control the printing device based on the third print data.

13. The solid object printing system of claim 8, wherein the three-dimensional sensor includes a two-dimensional sensor and an illumination unit configured to illuminate the solid object, and the two-dimensional sensor is configured to detect the shadow of a drawing surface of the solid object formed by the illumination unit, thereby acquiring a three-dimensional posture of the solid object.

14. A solid object printing method, comprising:

detecting, by a detection unit, positions of a plurality of detection references printed on a print table and positions of a plurality of detection points set on a surface of a solid object mounted on the print table;

calculating, by a control unit, a position and an rotation angle of the solid object based on the positions of the plurality of detection references and the positions of the plurality of detection points detected by the detection unit;

generating, by a print data generation unit, print data corresponding to the solid object mounted on the print table based on the position and the rotation angle of the solid object mounted on the print table calculated by the control unit; and performing, by a print unit, printing on the solid object mounted on the print table by the print data generated by the print data generation unit.

* * * * *